(12) United States Patent
Antanaitis et al.

(10) Patent No.: US 8,146,719 B2
(45) Date of Patent: Apr. 3, 2012

(54) DISK BRAKE FRICTION SURFACES WITH TUNABLE INDENT PATTERNS FOR MINIMIZING BRAKE PAD RADIAL TAPER WEAR

(75) Inventors: David B. Antanaitis, Northville, MI (US); Mark T. Riefe, Brighton, MI (US); Brent D. Lowe, Milford, MI (US); Patrick J. Monsere, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 654 days.

(21) Appl. No.: 12/109,382

(22) Filed: Apr. 25, 2008

(65) Prior Publication Data

US 2009/0266653 A1    Oct. 29, 2009

(51) Int. Cl.
  *F16D 65/12* (2006.01)
(52) U.S. Cl. .................... 188/218 XL; 188/18 A
(58) Field of Classification Search ............ 188/18 A, 188/218 XL, 264 R, 264 E; 451/63; 29/434
See application file for complete search history.

(56) References Cited

U.S. PATENT DOCUMENTS

| | | | |
|---|---|---|---|
| 3,295,640 A | | 1/1967 | Beuchle |
| 3,809,192 A | * | 5/1974 | Stehle ............... 188/218 XL |
| 4,766,702 A | * | 8/1988 | Kinner ............... 451/63 |
| 5,480,007 A | | 1/1996 | Hartford |
| 5,626,211 A | | 5/1997 | Gewelber et al. |
| 6,119,828 A | | 9/2000 | Parsons |
| 6,131,707 A | * | 10/2000 | Buechel et al. ...... 188/218 XL |
| 6,446,770 B2 | * | 9/2002 | Qian et al. .......... 188/218 XL |
| 7,077,247 B2 | | 7/2006 | Burgoon et al. |
| 7,097,006 B2 | | 8/2006 | Veneziano et al. |
| 7,097,007 B2 | | 8/2006 | Lin |
| 2001/0040077 A1 | | 11/2001 | Qian et al. |
| 2002/0139622 A1 | * | 10/2002 | Chen ............... 188/218 XL |
| 2003/0034213 A1 | | 2/2003 | Qian et al. |

FOREIGN PATENT DOCUMENTS

| | | | |
|---|---|---|---|
| DE | 19824465 A1 | * | 12/1999 |
| JP | 03255233 A | * | 11/1991 |
| JP | 2003314597 | | 11/2003 |
| SU | 1686238 A1 | * | 10/1991 |
| WO | 9502130 | | 1/1995 |
| WO | WO 2004088161 A1 | * | 10/2004 |
| WO | WO 2007082574 A1 | * | 7/2007 |
| WO | WO 2009075002 A1 | * | 6/2009 |

OTHER PUBLICATIONS

"Objective Characterization of Vehicle Brake Feel" by David G. Ebert and Richard A. Kaatz, SAE Technical Paper 940331 (Feb. 1994).
"The Effect of Rotor Crossdrilling on Brake performance" by David Antanaitis and Anthony Rifici, SAE Technical Paper 2006-01-0691 (Apr. 2006).
"The Effect of Racetrack / High Energy Driving on Brake Caliper Performance" by David Antanaitis and Joel Sanford, SAE Technical Paper 2006-01-0472 (Apr. 2006).

* cited by examiner

*Primary Examiner* — Thomas J Williams

(57) ABSTRACT

A brake rotor providing reduced brake pad radial taper wear by providing brake rotor friction surface indent patterns. For example, the indent patterns are the form of radial-biased grooves or linearly arranged cross-drill hole sets, patterned in a configuration that balances brake pad wear, thereby reducing brake pad radial taper wear in a manner tuned specifically for a given type of brake caliper and brake pad material, wherein the reduction in brake pad radial taper wear is accomplished with virtually no penalty to brake pad life.

28 Claims, 12 Drawing Sheets

DISK BRAKE FRICTION SURFACES WITH TUNABLE INDENT PATTERNS FOR MINIMIZING BRAKE PAD RADIAL TAPER WEAR

TECHNICAL FIELD

The present invention relates, in general, to vehicle disk brake systems and in particular to the rotor friction surfaces thereof. More particularly, the present invention relates to indent patterns in the rotor friction surfaces which are tuned to produce even brake pad wear, and attendantly improve the brake feel of the brake system.

BACKGROUND OF THE INVENTION

Motor vehicle disk brake systems utilize, at each wheel, a brake rotor connected to an axle hub of a rotatable axle of the motor vehicle, and an opposing set of selectively movable brake pads connected to a non-rotating brake caliper which carries a set of brake pads. The brake rotor includes opposing brake pad engagement surfaces, or rotor cheeks, wherein when braking is to occur, the braking system causes the caliper to press the brake pads upon respective brake pad engagement surfaces of the rotor cheek. Frictional interaction between the rotating rotor cheeks and non-rotating brake pads causes braking of the motor vehicle to transpire, the rate of braking depending upon the pressure of the brake pads against the rotor cheeks.

In the automotive art, modern hydraulic braking systems typically include an operator or driver interface, such as a brake pedal. As the driver applies force to this pedal, this force is transmitted by means of control arms and other related devices to the master cylinder. The master cylinder accepts mechanical force as input and produces hydraulic pressure, in the form of pressurized brake fluid, as an output. This pressure is conveyed by means of pressurized brake fluid through lines and valves of the motor vehicle to interface with each brake corner, found near each wheel of the motor vehicle.

FIG. 1A schematically depicts a brake corner 10, known in the art, configured for the usage of a sliding caliper (i.e., piston(s) at one side of the caliper). A brake line 12 conveys hydraulic brake fluid into the brake corner 10. This permits the application of force from the master cylinder (not shown) through pressurization of the hydraulic brake fluid, thereby creating a means of hydraulic control of the hydraulically active components of the brake caliper 20. The hydraulic brake fluid passes into a caliper actuator cylinder 22 and makes contact with a caliper actuator piston 24. The inboard side of the brake caliper 20a is hydraulically active in a sliding caliper configuration, whereas the outboard side of the brake caliper 20b is hydraulically inactive. A brake pad 32a, 32b, is respectively affixed at each side of the brake caliper 20, so that when the hydraulic brake fluid in the brake line 12 supplying the brake corner 10 is pressurized, the brake caliper 20 causes the brake pads to squeeze upon the rotor friction surfaces (i.e., rotor cheeks) 30a of the brake rotor 30, thereby inducing braking of the vehicle. The rotor cheeks 30a, are each located on a respective rotor plate 34a, 34b, mutually separated by vanes 36.

FIG. 1B schematically depicts a brake corner 10', known in the art, configured for the usage of a fixed caliper (i.e., piston(s) at each side of the caliper). In this case, each side of the brake caliper 20' is hydraulically active and contains a caliper actuator cylinder 22a, 22b which in turn contains a caliper actuator piston 24a, 24b. A brake pad 32a', 32b', is respectively affixed at both sides of the brake caliper 20' so that when the hydraulic brake fluid is pressurized in the master cylinder, the pressure is transmitted via the hydraulic brake fluid to the caliper actuator pistons 24a, 24b, causing the brake caliper 20' to engage the brake pads to squeeze upon the cheeks 30a' of the brake rotor 30', inducing braking of the vehicle. The rotor cheeks 30a', are each located on a respective rotor plate 34a', 34b', mutually separated by vanes 36'.

Historically, engineering of the human interface with a braking system has been a subjective endeavor. With the advent of a Brake Feel Index (BFI) as reported in SAE technical paper 940331 "Objective Characterization of Vehicle Brake Feel" by D. G. Ebert and R. A. Kaatz (1994), a method was developed to correlate objective engineering parameters to these subjective assessments. In the case of BFI, such aspects as pedal application force, pedal travel and pedal preload are compared to desired target values which correlate to a particular type of response desired and the deviation from these target values is reflected in a lower index value. In disk brake systems, one of the primary causes of undesirable brake pedal feel has been brake pad radial taper wear.

Brake pad (or brake lining) radial taper wear develops with brake usage, wherein the taper angle tends to increase with more aggressive, higher energy brake usage conditions. Brake pad radial taper wear is driven by flexure of the caliper housing under hydraulic pressure, causing a radial pressure gradient over the friction surface by differences in sliding speed over the friction surfaces and by distortion of brake corner components under braking and/or thermal loads, including knuckle abutment distortion and brake rotor coning. Sliding caliper applications will tend to develop most of their radial taper wear on the outboard side, and fixed caliper applications will tend to develop more equalized inboard to outboard radial taper wear, wherein the radial taper wear in fixed caliper applications is usually less pronounced than that of the outboard side of sliding caliper applications.

The primary impact that radial taper wear has on the driver is brake torque variation, which can be perceived as brake pulsing, particularly in high energy applications. Other consequences produced on brake feel by radial taper wear include, but are not limited, to excessive pedal travel and excessive pedal force required in high energy brake applications. It is possible to partially mitigate the effects promoting radial taper wear by optimizing the pad shape, i.e., using a fan shaped pad. However, in many applications it is impractical to impossible to fully stop radial taper wear via pad shape.

Also known in the art is the practice of modifying the brake rotor surface mechanically by cutting grooves into the surface of the rotors, or by drilling holes (i.e., cross-drill holes) forming patterns of holes in a particular configuration. These modifications have been used to increase the friction between the frictional surfaces of the rotor and the brake pad to enhance the removal of heat from the frictional surfaces for purpose of prolonging life of the brake pad material, or to facilitate the clearing of debris which may build up over time between the brake frictional surfaces. Another application of placing grooves in the head is to reduce vibration during braking, wherein the grooves are used to provide a means through which the stresses on the brake pad are balanced while not impairing its coefficient of friction.

Accordingly, what remains needed in the art is a means to enhance the surface characteristics of the friction surfaces of disk braking systems to reduce the radial taper wear behavior of the brake pad surfaces, through a balancing or evening out of the brake pad surface wear.

SUMMARY OF THE INVENTION

The present invention enhances the surface wear characteristics of brake pad friction surfaces of rotors of disk brake systems to reduce the radial taper wear of the brake pad (or brake lining) friction surfaces. Additionally, the present invention provides an adjustment of these enhanced surface wear characteristics tailored to match the type of calipers used in the braking system.

The present invention balances (i.e., evens) brake pad radial taper wear by providing brake rotor friction surface indent patterns, for example in the form of radial-biased grooves or linearly arranged cross-drill hole sets, patterned in a configuration that balances brake pad wear, thereby reducing brake pad radial taper wear in a manner tuned specifically for a given type of brake caliper and brake pad material.

The benefit of the present invention to the driver of the vehicle is improved brake feel in high energy driving conditions, in the form of lower pedal force and pedal travel. In some applications, the invention will also reduce the characteristic brake torque variation or brake pedal pulsation associated with high energy driving conditions. This is accomplished with virtually no penalty to brake pad life, versus the current state of the art, as discussed above, which involves cross-drilling or grooving on both sides of the rotor, for reasons other than to control radial taper wear, extending into most of the swept friction areas of the rotor cheeks, and accompanied by a significant penalty in the reduction of brake pad life.

The different types of calipers, as indicated by FIGS. 1A and 1B, impart different forces upon the friction surface of the brake pads. As discussed in the background of invention, these forces produce different wear characteristics for different calipers. The present invention employs the brake rotor friction surface indent patterns to increase brake pad wear in the areas less affected by the application of the calipers. This enhanced wear in these areas will, in effect, equalize the wear produced in the areas of the brake pad surface to the wear produced in areas strongly affected by the operation of the calipers, which, in turn, will promote a more radially even wear in the brake pad surface based on the knowledge that grooving or cross-drilling of the brake rotor friction surfaces tends to increase brake pad surface wear thereover.

In a preferred embodiment of the present invention for use in a sliding caliper application (i.e., FIG. 1A), brake rotor friction surface indent patterns according to the present invention are formed in the rotor outboard friction surface. Additionally, the brake rotor friction surface indent patterns may also be added to the rotor inboard friction surface in the event the sliding caliper creates substantial radial taper wear (i.e., the radial taper wear is non-negligible) on the friction surface of the facing inboard brake pad; otherwise if radial taper wear of the facing inboard brake pad is insubstantial (i.e., the radial taper wear is negligible), then no brake rotor surface indent patterns need be present at the inboard friction surface.

Firstly with regard to the outboard friction surface, the brake rotor friction surface indent patterns are preferably in the form of grooving or cross-drilling patterns formed in the rotor outboard friction surface of the outboard side rotor cheek, originating preferably near the radial inner edge of the rotor cheek, generally outside of the swept friction surface, and extending in a radial direction toward the rotor outer edge. These indent patterns only partially cover the swept friction surface. The radial length of the grooves or of the cross-drill hole sets and the distribution (i.e., number, spacing and placement) of grooves or the cross-drill hole sets is adjusted (i.e., tuned) to the requirements of the caliper and brake pad material in the application. The grooves or the linear placement of the cross-drill hole sets may be oriented at a sweep angle with respect to the rotor radial direction in a manner such that the force of the interaction between the grooves or hole sets and the brake pads will impart a moment on the brake pads in a direction that will tend to alleviate radial taper wear.

Secondly with regard to the inboard friction surface, the brake rotor friction surface indent patterns, if used, are preferably in the form of grooving or cross-drilling patterns formed in the rotor inboard friction surface of the inboard side rotor cheek, originating preferably near the radial outer edge of the rotor cheek, generally outside of the swept friction surface, and extending in a radial direction towards the rotor center. These indent patterns only partially cover the swept friction surface. The radial length of the grooves or of the cross-drill hole sets and the distribution (i.e., number, spacing and placement) of grooves or cross-drill hole sets is adjusted to the requirements of the caliper and brake pad material in the application. The grooves or the linear disposition of the cross-drill hole sets may be placed at a sweep angle with respect to the rotor radial direction in a manner such that the force of the interaction between the grooves or cross-drill hole sets and the brake pads will impart a moment on the brake pads in a direction that will tend to alleviate radial taper wear.

In a preferred embodiment of the present invention for use in a fixed caliper application (i.e., FIG. 1B), brake rotor friction surface indent patterns are formed in the rotor inboard and outboard friction surfaces of the inboard and outboard rotor cheeks, respectively.

The brake rotor friction surface indent patterns are preferably in the form of grooving or cross-drilling patterns formed in the inboard and outboard friction surfaces of the inboard and outboard side rotor cheeks, originating preferably near the inside the radial inner edge of the rotor, generally outside of the swept friction surface swept friction surface, and extending in a radial direction towards the rotor radial outer edge partially, but not completely, over the swept friction surface. The radial length of the grooves or of the cross-drill hole sets and the distribution (i.e., number, spacing and placement) of grooves or cross-drill hole sets are adjusted to the requirements of the caliper and brake pad material in the application. The grooves or the linear disposition of the cross-drill hole sets may be placed at a sweep angle with respect to the rotor radial direction in a manner such that the force of the interaction between the grooves or the cross-drill hole sets and the brake pads will impart a moment on the pads in a direction that will tend to alleviate radial taper wear.

The radial length of the brake rotor surface indent patterns may be equal, or differing, wherein if differing, a preferred arrangement is for the brake rotor indent patterns to be arranged circumferentially around the rotor cheek in the form of serially repeating groups, the radial height of each brake rotor surface indent pattern radial of each group being progressively different in the sense each group starts with a shortest radial height, to progressively longer radial heights to a longest radial height, then to progressively shorter radial heights to the shortest radial height.

With respect to the sweep angle, this is an angle with respect to a radiant of the rotor, generally being preferably between 0 degrees and about 70 degrees, wherein where the sweep angle is greater than zero degrees, the radially innermost portion of the indent patterns is leading with respect to the rotation direction of the rotor when the motor vehicle is moving in a forward direction.

Accordingly, it is an object of the present invention to provide brake rotor friction surface indent patterns in the rotor cheeks of disk brake systems to improve the radial taper wear behavior of the brake pad friction surfaces, wherein these indent patterns are adjusted to match the different performance requirements of different applications so as to mitigate the radial taper wear characteristics associated with particular caliper applications.

This and additional objects, features and advantages of the present invention will become clearer from the following specification of a preferred embodiment.

BRIEF DESCRIPTION OF THE DRAWINGS

FIG. 2D is also a plan view of the inboard and outboard sides of a modified rotor according to the present invention having brake rotor friction surface indent patterns in the form of uniform length grooves configured for a fixed caliper application.

FIG. 3D is also a plan view of the inboard and outboard sides of a modified rotor according to the present invention having brake rotor friction surface indent patterns in the form of uniform length cross-drill hole sets configured for a fixed caliper application.

FIG. 4C is also a plan view of the inboard and outboard sides of a modified rotor according to the present invention having brake rotor friction surface indent patterns in the form of non-uniform length grooves configured for a fixed caliper application.

FIG. 5C is also a plan view of the inboard and outboard sides of a modified rotor according to the present invention having brake rotor friction surface indent patterns in the form of non-uniform length cross-drill hole sets configured for a fixed caliper application.

DESCRIPTION OF THE PREFERRED EMBODIMENT

Figure 1A:
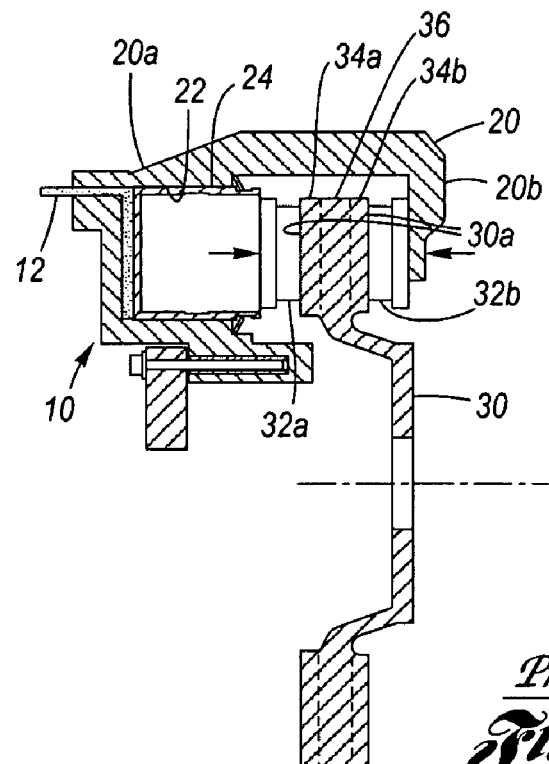
FIG. 1A is a cross-sectional view of a prior art disk brake system employing a sliding caliper configuration.
Figure 1B:
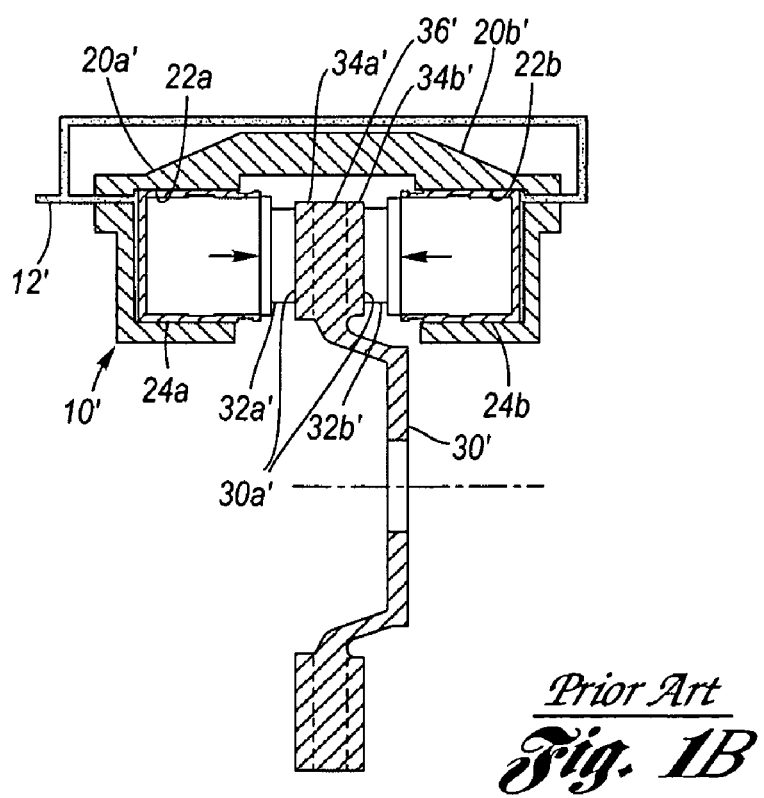
FIG. 1B is a cross-sectional view of a prior art disk brake system employing a fixed caliper configuration.

Referring now to the Drawing, FIGS. 2A through 5C depict examples of disk brake systems which contain rotors with brake rotor friction surface indent patterns which are tuned, according to the present invention, to the choice of brake pad material and caliper configuration so as to promote even wear of the brake pad and thereby reduce radial taper wear of the brake pad and improve the brake feel consequences that would otherwise be associated with radial taper wear. The following description of the preferred embodiment is merely exemplary in nature and is not intended to limit the invention, its applications, or its uses.

Figure 2A:
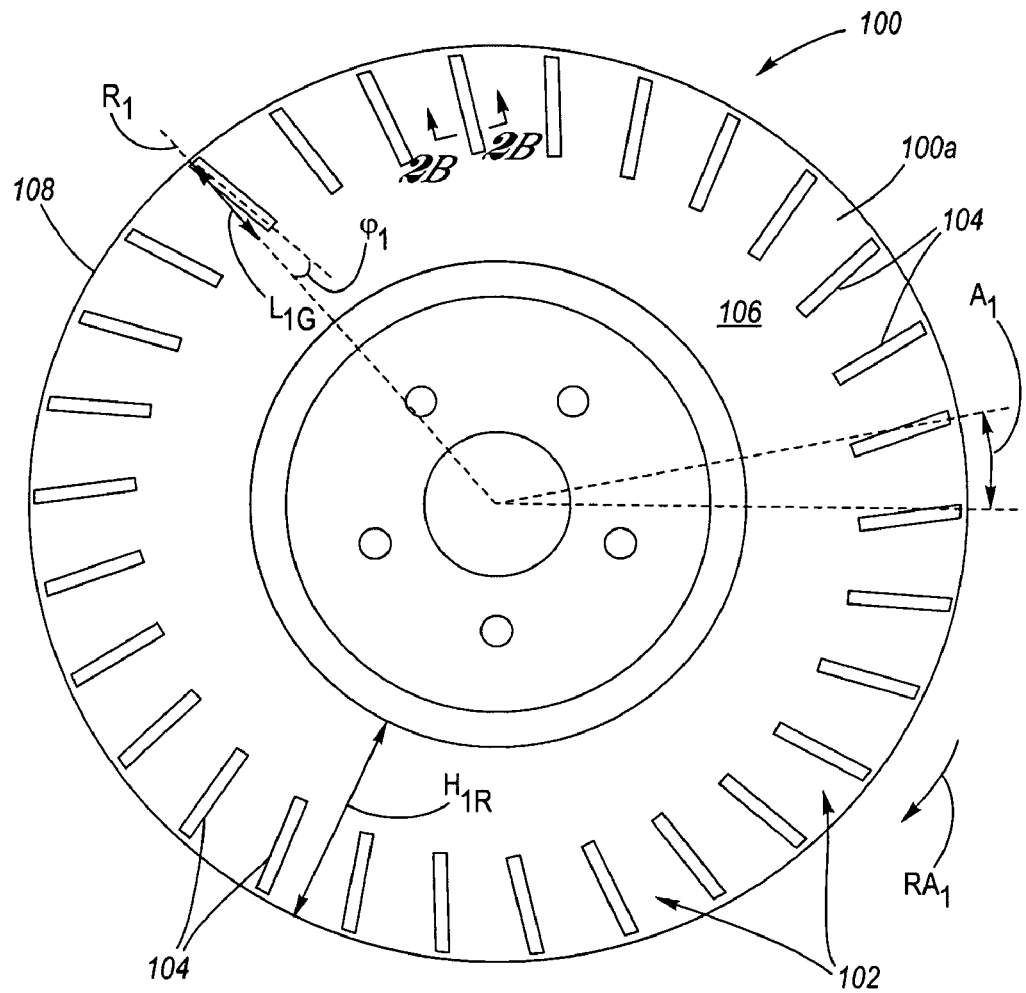
FIG. 2A is a plan view of the inboard side of a modified rotor according to the present invention having, if needed to reduce radial taper wear, brake rotor friction surface indent patterns in the form of uniform length grooves originating from near the radial outer edge of the rotor configured for a sliding caliper application.

FIG. 2A shows the inboard side 100a of a modified brake rotor 100 according to the present invention. In this modification for use with a sliding caliper application in which radial taper wear is substantial thereat, the brake rotor friction surface indent patterns 102 are in the form of grooves 104 in the friction surface of the rotor cheek 106 at the inboard side 100a of the rotor 100. Each groove 104 is of the same radial height (or radial length) $L_{1G}$, set at a sweep angle of $\phi_1$ with respect to the radiant $R_1$ of the rotor. Each groove 104 originates near (i.e., about 6 mm inside from) the radial outer edge 108 of the rotor cheek, preferably outside of the swept friction surface, and each groove is separated in this example from its neighboring groove by an angular separation $A_1$ of 12 degrees. The radial height $L_{1G}$ is less than the radial height $H_{1R}$ of the rotor friction surface 106, as described below with respect to FIGS. 6A through 8. The rotation arrow $RA_1$ shows the rotor rotation when the vehicle is moving forward. The foregoing being exemplary, the number of grooves may be more or less, and the sweep angle of each groove may be the same or be selectively different.

Figure 2B:
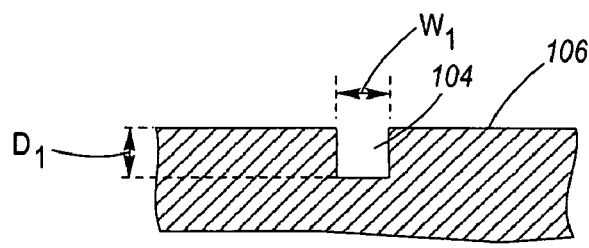
FIG. 2B is a cross-sectional view seen along the line 2B-2B of FIG. 2A, showing the cross-section of a groove.

FIG. 2B is a cross-sectional view of the same rotor 100, showing a groove 104 formed in the rotor friction surface 106, wherein the groove has a depth $D_1$ of for example 0.5 mm and a width $W_1$ of for example 1.58 mm, and wherein for example the radial height $L_{1G}$ may be 25 mm, wherein the rotor friction surface radial height $H_{1R}$ may be 64 mm.

Figure 2D:
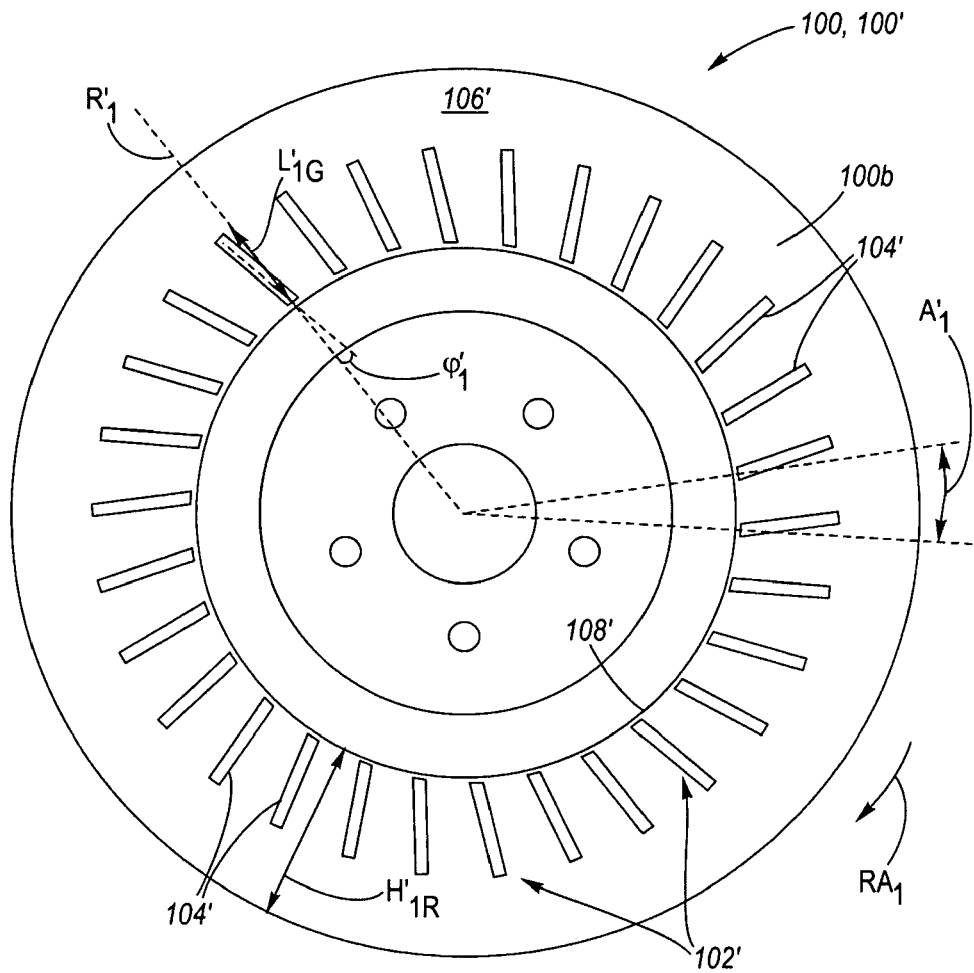
FIG. 2D is a plan view of the outboard side of a modified rotor for use with the rotor of FIGS. 2A and 2C for use in a sliding caliper application, having brake rotor friction surface indent patterns in the form of uniform length grooves originating from near the radial inner edge of the rotor.
Figure 2C:
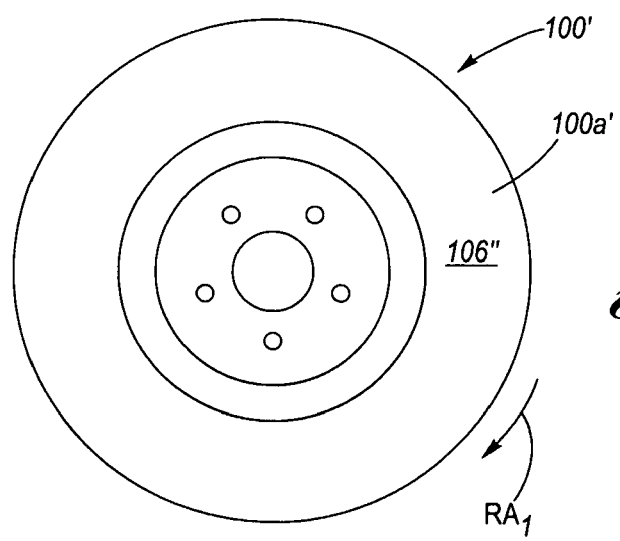
FIG. 2C is a plan view of the inboard side of a modified rotor for use in a sliding caliper application where radial taper wear is not a problem, whereby no brake rotor friction indent patterns are provided.

FIG. 2C shows the inboard side 100a' of a modified brake rotor 100' in which radial taper wear is insubstantial such that no brake rotor friction surface indent patterns are needed at the rotor cheek 106" at the inboard side 100a' of the rotor 100'. The rotation arrow $RA_1$ shows the rotor rotation when the vehicle is moving forward.

FIG. 2D shows the outboard side 100b of the modified brake rotor 100, 100' for use in a sliding caliper application in conjunction with the inboard side 100a, 100a' of, respectively, either FIGS. 2A or 2C. Although the description below pertains to rotors 100, 100' it is to be understood that FIG. 2D also pertains to the inboard and outboard sides of a brake rotor for use in a fixed caliper application.

Brake rotor friction surface indent patterns 102' are in the form of grooves 104' in the friction surface of the rotor cheek 106' at the outboard side 100b of the rotor 100, 100'. Each groove 104' is of the same length $L'_{1G}$, set at a sweep angle of $\phi_1'$ with respect to the radiant $R'_1$ of the rotor. Each groove 104 originates near (i.e., about 6 mm inside from) the radial inner edge 108' of the rotor cheek, preferably outside of the swept friction surface, and each groove 104' is separated in this example from its neighboring groove by an angular separation $A_1'$ of 12 degrees. The length, depth and width of the grooves 104' may be as those of the inboard side described above, or otherwise, wherein the radial height $L'_{1G}$ is less than the radial height $H'_{1R}$ of the rotor friction surface 106', as described below with respect to FIGS. 6A through 8. The rotation arrow $RA_1$ shows the rotor rotation when the vehicle is moving forward. The foregoing being exemplary, the number of grooves may be more or less, and the sweep angle of each groove may be the same or be selectively different.

Figure 3A:
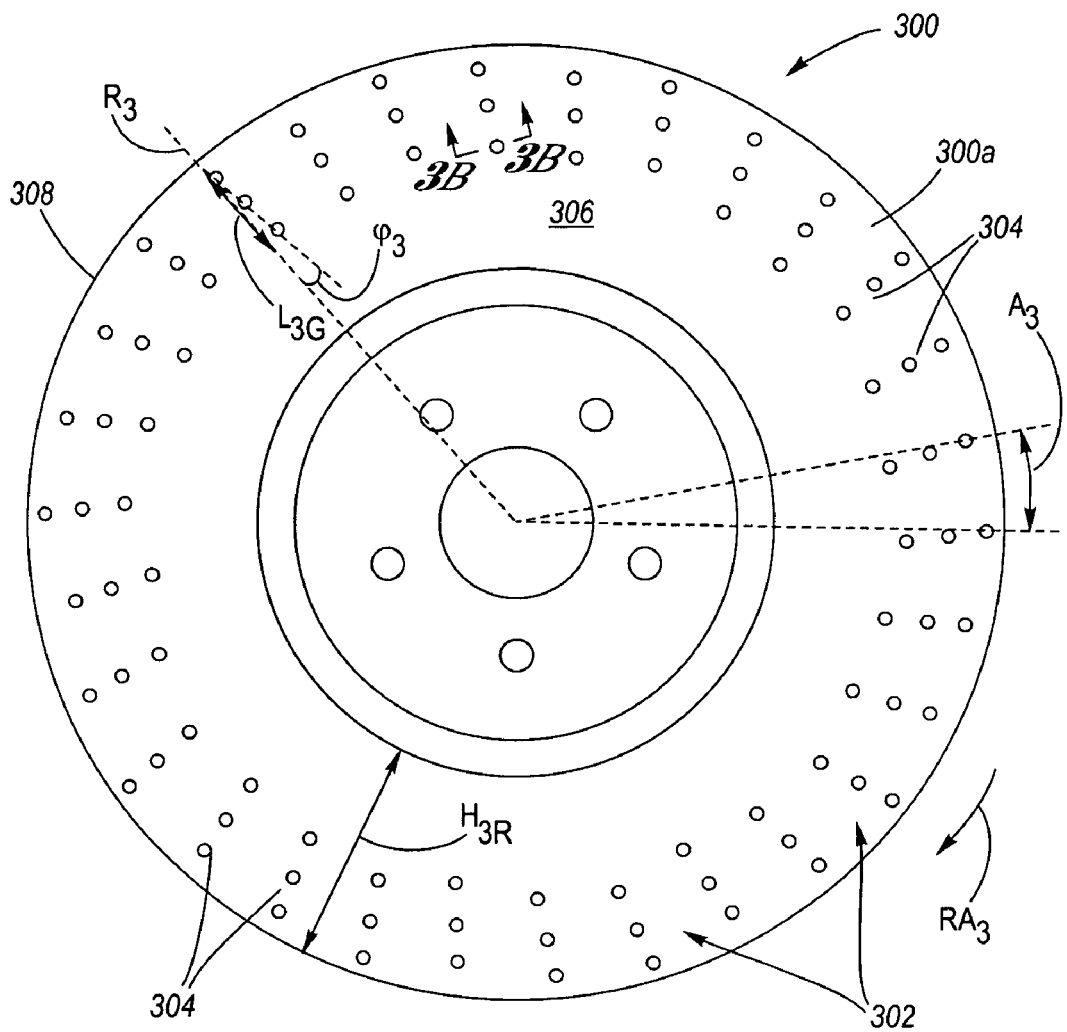
FIG. 3A is a plan view of the inboard side of a modified rotor according to the present invention having, if needed to reduce radial taper wear, brake rotor friction surface indent patterns in the form of uniform length cross-drill hole sets originating from near the radial outer edge of the rotor configured for a sliding caliper application.

FIG. 3A shows the inboard side 300a of a modified brake rotor 300 according to the present invention. In this modification for use with a sliding caliper application in which radial taper wear is substantial thereat, brake rotor friction surface indent patterns 302 are in the form of a plurality of cross-drill hole sets 304 consisting of a plurality of linearly arranged individual cross-drill holes 304a which are formed in the friction surface of the rotor cheek 306 at the inboard side 300a of the rotor 300. Each cross-drill hole set 304 is of the same radial height (or radial length) $L_{3G}$, set at a sweep angle of $\phi_3$ with respect to the with respect to the radiant $R_3$ of the rotor. Each cross-drill hole set 304 originates generally about 6 mm inside from the radial outer edge 308 of the rotor cheek, preferably outside of the swept friction surface, and each cross-drill hole set is separated in this example from its neighboring cross-drill hole set by an angular separation $A_3$ of 12 degrees. The radial height $L_{3G}$ is less than the radial height $H_{3R}$ of the rotor friction surface 306, as per the below description with respect to FIGS. 6A through 8. The rotation arrow $RA_3$ shows the rotor rotation when the vehicle is moving forward. The foregoing being exemplary, the number of hole sets may be more or less, and the sweep angle of each hole set may be the same or be selectively different.

Figure 3B:
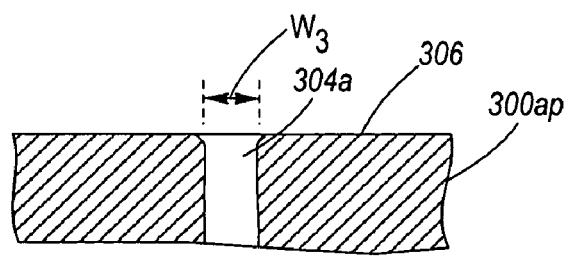
FIG. 3B is a cross-sectional view seen along the line 3B-3B of FIG. 3A, showing the cross-section of a cross-drill hole.

FIG. 3B is a cross-sectional view of the same rotor 300 showing the cross-section of an individual drill hole 304a, wherein the hole extends through the rotor plate 300ap on which the rotor cheek 306 is disposed and a cross-sectional diameter $W_3$ of for example 3.0 mm, the holes being linearly aligned and mutually separated between 10 and 15 mm on center, wherein the radial height $L_{3G}$ of the cross-drill hole set may be 25 mm, and wherein the rotor friction surface radial height $H_{3R}$ may be 64 mm.

Figure 3D:
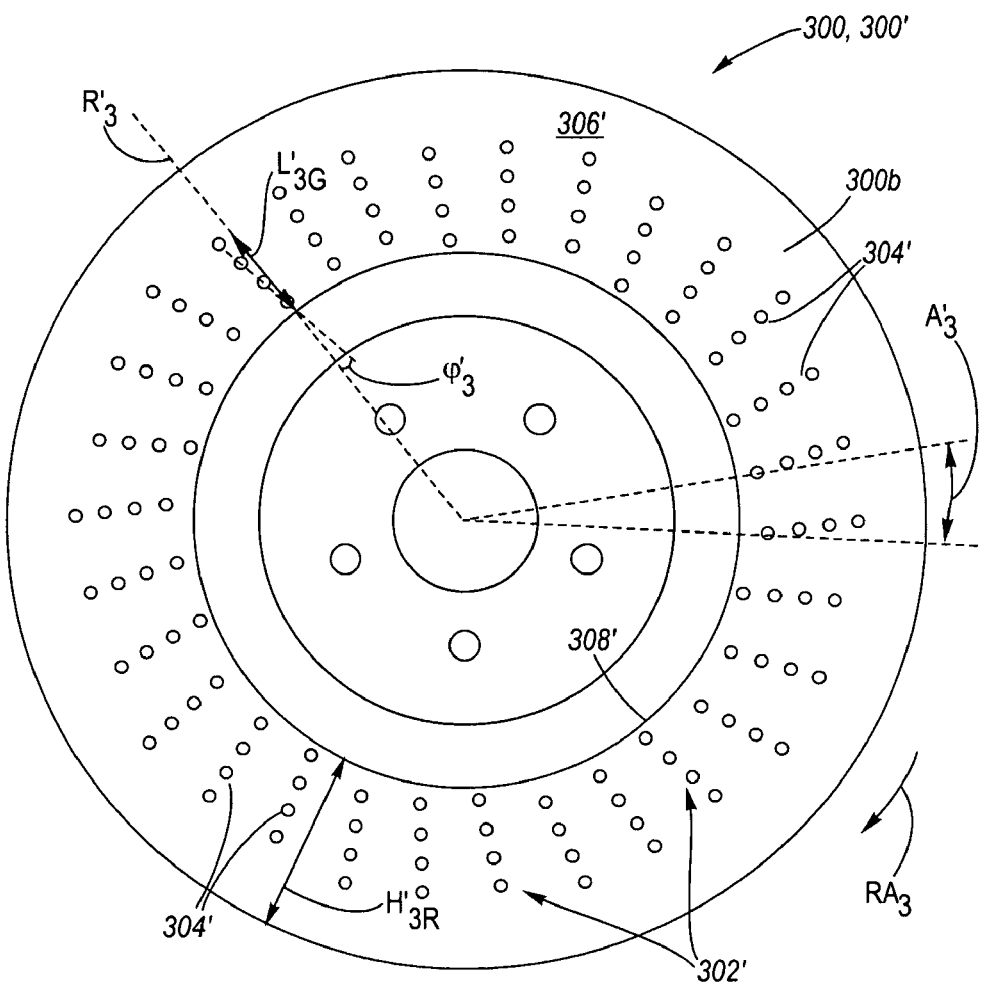
FIG. 3D is a plan view of the outboard side of a modified rotor for use with the rotor of FIGS. 3A and 3C for use in a sliding caliper application, having brake rotor friction surface indent patterns in the form of uniform length cross-drill hole sets originating from near the radial inner edge of the rotor.
Figure 3C:
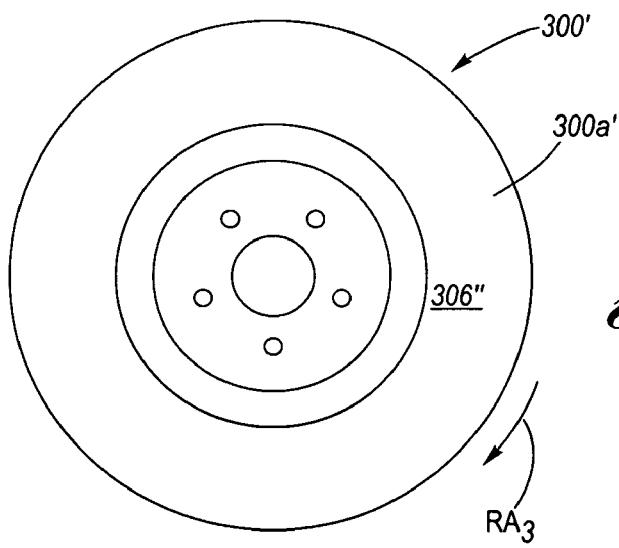
FIG. 3C is a plan view of the inboard side of a modified rotor for use in a sliding caliper application where radial taper wear is not a problem, whereby no brake rotor friction indent patterns are provided.

FIG. 3C shows the inboard side 300a' of the modified brake rotor 300' in which radial taper wear is insubstantial such that no brake rotor friction surface indent patterns are needed at the rotor cheek 306" at the inboard side 300a' of the rotor 300'. The rotation arrow $RA_3$ shows the rotor rotation when the vehicle is moving forward.

FIG. 3D shows the outboard side 100b of the modified brake rotor 300, 300' for use in a sliding caliper application in conjunction with the inboard side 300a, 300a' of, respectively, either FIGS. 3A or 3C. Although the description below pertains to rotors 300, 300' it is to be understood that FIG. 3D also pertains to the inboard and outboard sides of a brake rotor for use in a fixed caliper application.

Brake rotor friction surface indent patterns 302' are in the form of a plurality of cross-drill hole sets 304' consisting of a plurality of linearly arranged individual cross-drill holes 304a' which are formed in the friction surface of the rotor cheek 306' of the outboard side 300b of the rotor 300. Each cross-drill hole set 304' is of the same radial height (or radial length) $L'_{G3}$, set at a sweep angle of $\phi'_3$ with respect to the radiant $R'_3$ of the rotor. Each cross-drill hole set 304' originates generally about 6 mm inside from the radial inner edge 308' of the rotor cheek, preferably outside of the swept friction surface, and each cross-drill hole set is separated in this example from its neighboring cross-drill hole set by an angular separation $A'_3$ of 12 degrees. The length, depth and width of the cross-drill hole sets 304' may be as those of the inboard side described above, or otherwise, wherein the radial height $L'_{3G}$ is less than the radial height $H'_{3R}$ of the rotor friction surface 306', as per the below description with respect to FIGS. 6A through 8. The rotation arrow $RA_3$ shows the rotor rotation when the vehicle is moving forward. The foregoing being exemplary, the number of hole sets may be more or less, and the sweep angle of each hole set may be the same or be selectively different.

Figure 4A:
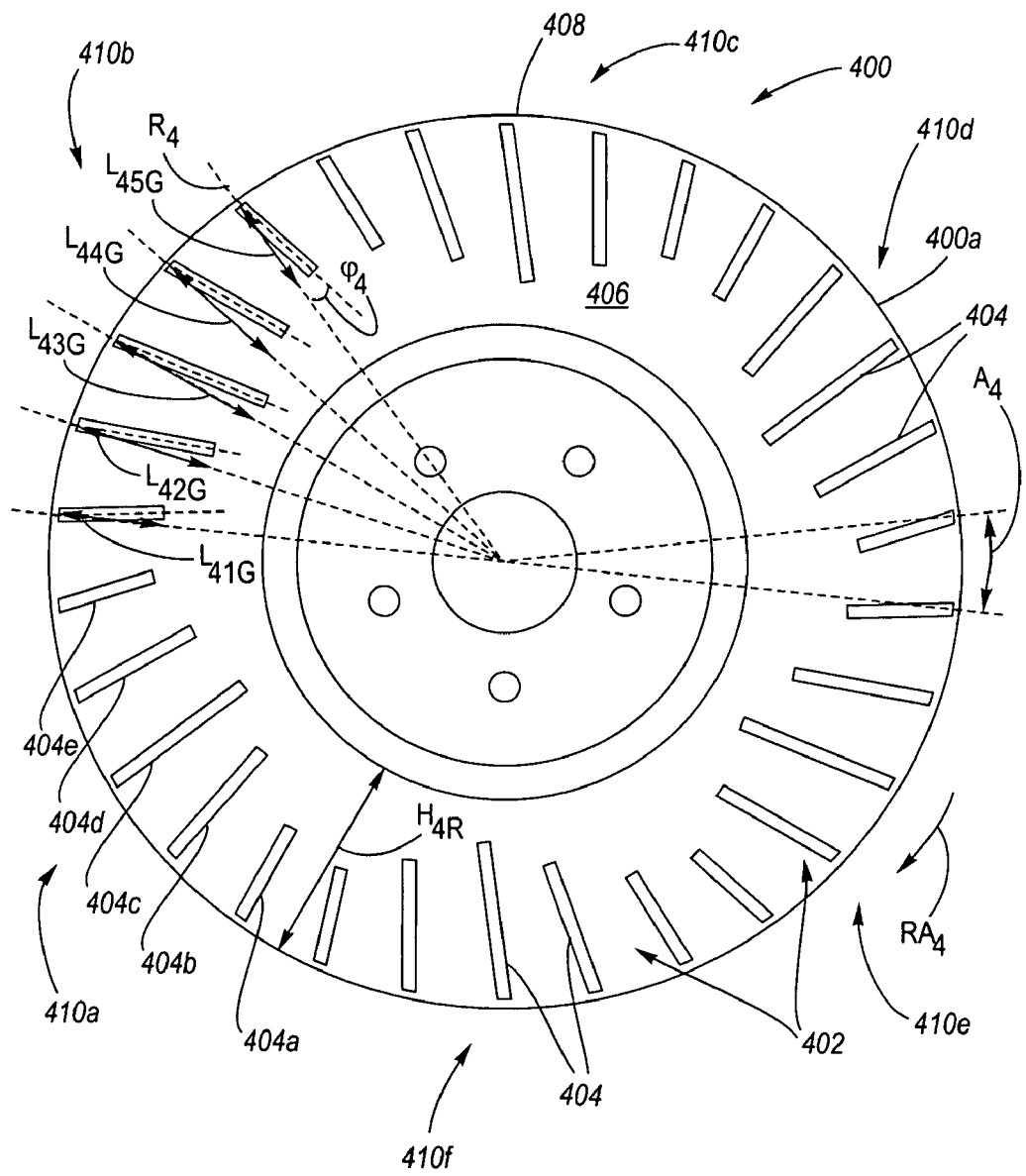
FIG. 4A is a plan view of the inboard side of a modified rotor according to the present invention having, if needed to reduce radial taper wear, brake rotor friction surface indent patterns in the form of non-uniform length grooves originating from near the radial outer edge of the rotor configured for a sliding caliper application.

FIG. 4A shows the inboard side 400a of a modified brake rotor 400 according to the present invention. In this modification for use with a sliding caliper application in which radial taper wear is substantial thereat, brake rotor friction surface indent patterns 402 are in the form of six periodically repeating groove groups 410a through 410f, each groove group including grooves 404a through 404e (labeled at groove group 410a), disposed circumferentially around, and formed in, the friction surface of the rotor cheek 406 of the inboard side 400a of the rotor 400. While the depth and width of the grooves may be, for example, as described above, or otherwise, each groove 404a through 404e of each groove group is of a progressively non-uniform (differing) radial height (or radial length) $L_{41G}$ through $L_{45G}$, (labeled at groove group 410b), and is set at a sweep angle of $\phi_4$ with respect to the radiant $R_4$ of the rotor. Each groove 404 originates near (i.e., about 6 mm inside from) the radial outer edge 408 of the rotor cheek, preferably outside of the swept friction surface, and each groove is separated in this example from its neighboring groove by an angular separation $A_4$ of 12 degrees. The radial height $L_{41G}$ through $L_{45G}$ is less than the radial height $H_{4R}$ of the rotor friction surface 406, as per the below description with respect to FIGS. 6A through 8. The rotation arrow $RA_4$ shows the rotor rotation when the vehicle is moving forward. The foregoing being exemplary, the number of grooves and/or groove groups may be more or less, and the sweep angle of each groove may be the same or be selectively different.

Figure 4C:
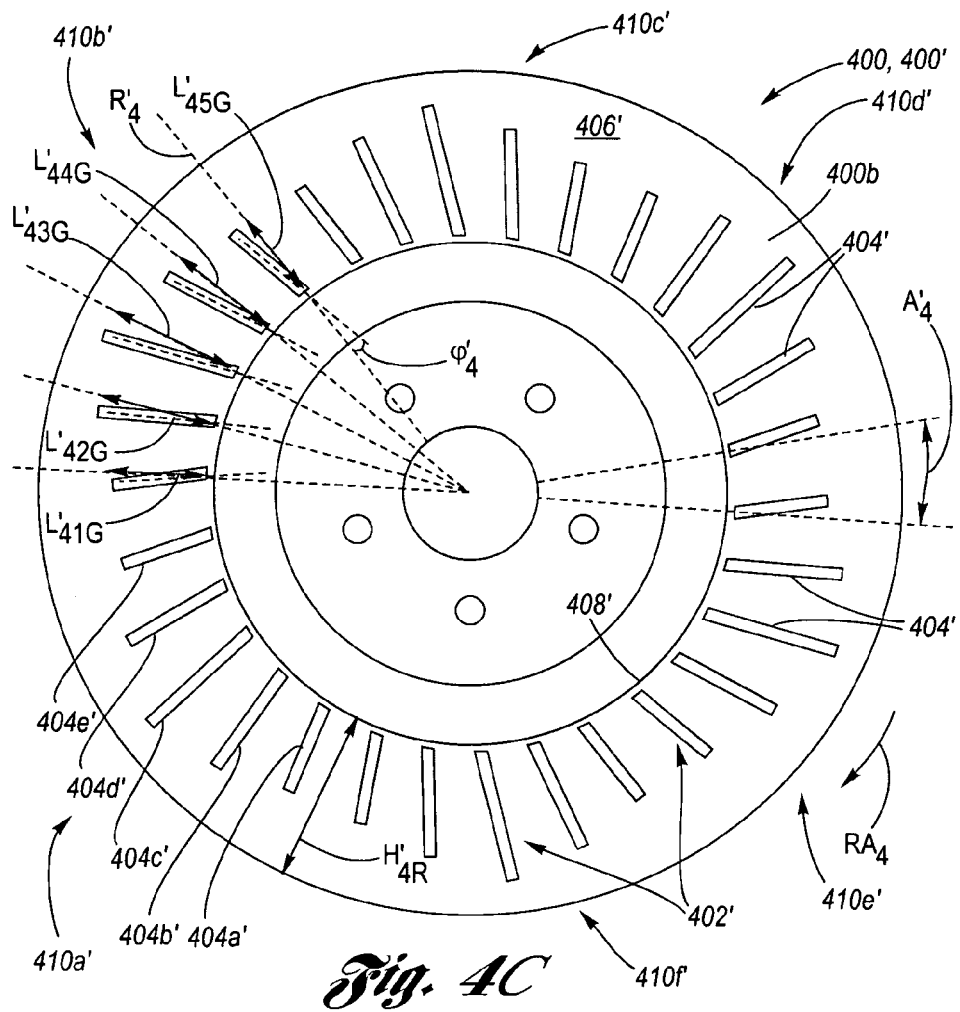
FIG. 4C is a plan view of the outboard side of a modified rotor for use with the rotor of FIGS. 4A and 4B for use in a sliding caliper application, having brake rotor friction surfaces indent patterns in the form of non-uniform length grooves originating from near the radial inner edge of the rotor.
Figure 4B:
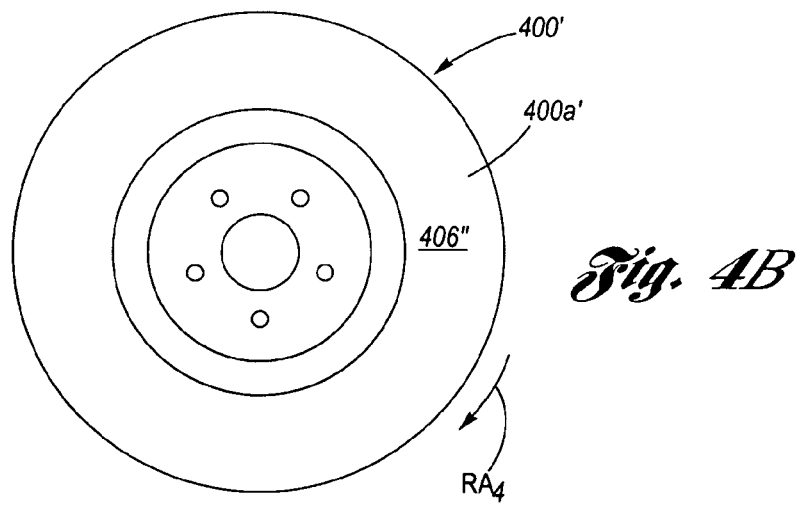
FIG. 4B is a plan view of the inboard side of a modified rotor for use in a sliding caliper application where radial taper wear is not a problem, whereby no brake rotor friction indent patterns are provided.

FIG. 4B shows the inboard side 400a' of the modified brake rotor 400' in which radial taper wear is insubstantial such that no brake rotor friction surface indent patterns are needed at the rotor cheek 406' at the inboard side 400a' of the rotor 400'. The rotation arrow $RA_4$ shows the rotor rotation when the vehicle is moving forward.

FIG. 4C shows the outboard side 400b of a modified brake rotor 400, 400' for use in a sliding caliper application in conjunction with the inboard side 400a, 400a' of, respectively, either FIGS. 4A or 4B. Although the description below pertains to rotors 400, 400' it is to be understood that FIG. 4C also pertains to the inboard and outboard sides of a brake rotor for use in a fixed caliper application.

The brake rotor friction surface indent patterns 402' are in the form of six periodically repeating groove groups 410a' through 410f', each groove group including grooves 404a' through 404e' (labeled at groove group 410a'), disposed circumferentially around, and formed in, the friction surface of the rotor cheek 406' of the inboard side 400b of the rotor 400. While the depth and width of the grooves may be, for example, as described above, or otherwise, each groove 404a' through 404e' of each groove group is of a progressively non-uniform (differing) radial height (or radial length) $L'_{41G}$ through $L'_{45G}$, (labeled at groove group 410b'), and is set at a sweep angle of $\phi'_4$ with respect to the radiant $R'_4$ of the rotor. Each groove 404' originates near (i.e., about 6 mm inside from) the radial inner edge 408' of the rotor cheek, preferably outside of the swept friction surface, and each groove is separated in this example from its neighboring groove by an angular separation $A'_4$ of 12 degrees. The radial height $L'_{41G}$ through $L'_{45G}$ is less than the radial height $H'_{4R}$ of the rotor friction surface 406', as per the below description with respect to FIGS. 6A through 8. The rotation arrow $RA_4$ shows the rotor rotation when the vehicle is moving forward. The foregoing being exemplary, the number of grooves and/or groove groups may be more or less, and the sweep angle of each groove may be the same or be selectively different.

By way merely to exposit a comparative, non-limiting example, the sweep angle $\phi_4$, $\phi'_4$ is 20 degrees, and the progressive radial heights may be as follows: groove $L_{41G}$, $L'_{41G}$ is a "short" radial height of 21.7 mm, adjacent groove $L_{42G}$, $L'_{42G}$ is a "medium" radial height of 31.7 mm, adjacent groove $L_{43G}$, $L'_{43G}$ is a "long" radial height of 41.7 mm, adjacent groove $L_{44G}$, $L'_{44G}$ is the "medium" radial height of 31.7 mm, and adjacent groove $L_{45G}$, $L'_{45G}$ is the "short" radial height of 21.7 mm.

Figure 5A:
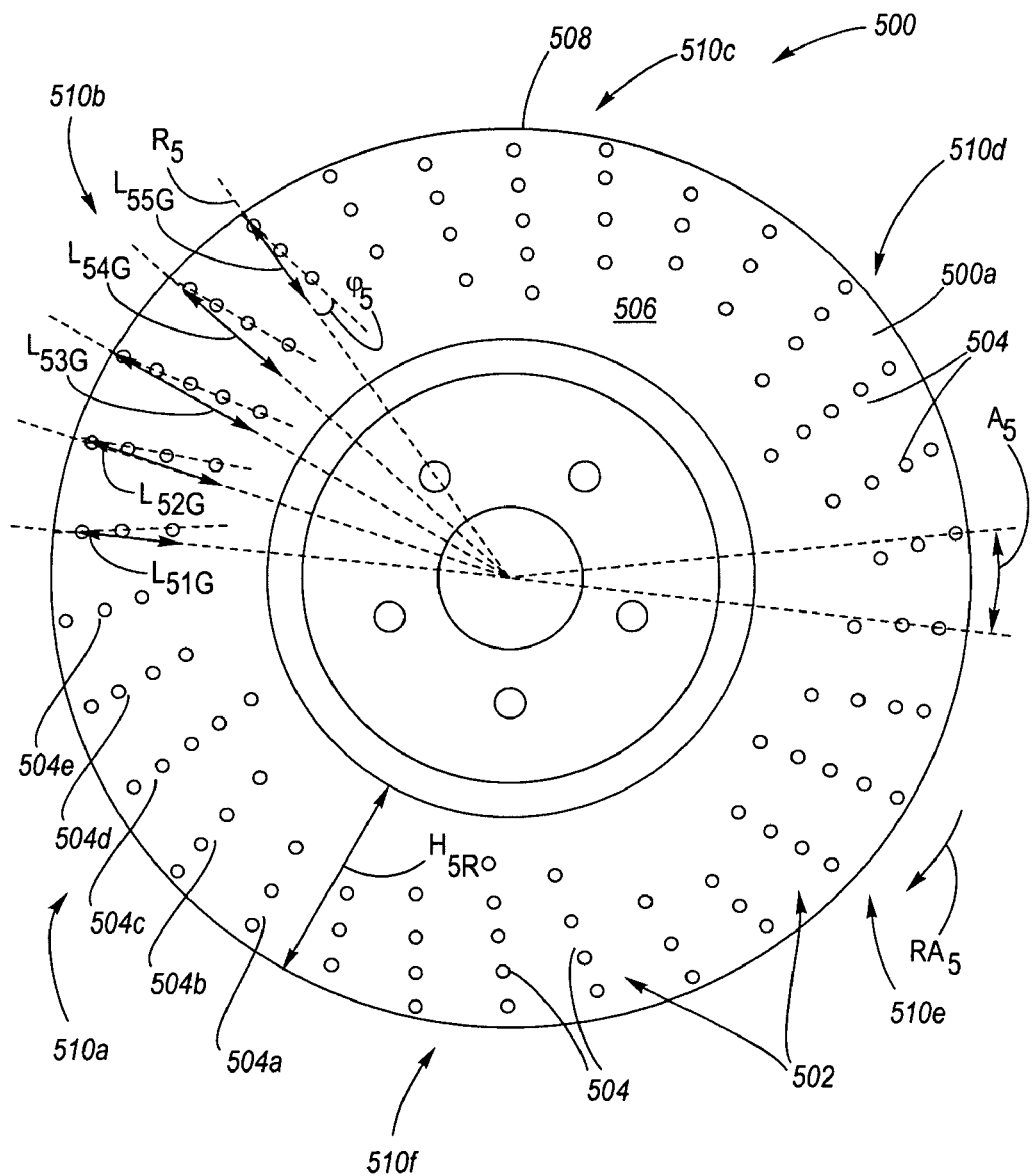
FIG. 5A is a plan view of the inboard side of a modified rotor according to the present invention having, if needed to reduce radial taper wear, brake rotor friction surface indent patterns in the form of non-uniform length cross-drill hole sets originating from near the radial outer edge of the rotor configured for a sliding caliper application.

FIG. 5A shows the inboard side 500a of a modified brake rotor 500 according to the present invention. In this modification for use with a sliding caliper application in which radial taper wear is substantial thereat, the brake rotor friction surface indent pattern 502 is in the form of six periodically repeating cross-drill hole set groups 510a through 510f, each cross-drill hole set group including cross-drill hole sets 504a through 504e (labeled at hole set group 510a), disposed circumferentially around, and formed in, the friction surface of the rotor cheek 506 of the inboard side 500a of the rotor 500. While the depth and cross-sectional diameter of the holes 504 may be, for example, as described above, or otherwise, each cross-drill hole set 504a through 504e of each cross-drill hole set group is of a progressively non-uniform (differing) radial height (or radial length) $L_{51G}$ through $L_{55G}$ (labeled at hole set group 510b), and is set at a sweep angle of $\phi_5$ with respect to the radiant $R_5$ of the rotor. Each cross-drill hole set 504 originates generally about 6 mm from the radial outer edge 508 of the rotor cheek, preferably outside of the swept friction surface, and each cross-drill hole set is separated in this example from its neighboring cross-drill hole set by an angular separation $A_5$ of 12 degrees. The radial height $L_{51G}$ through $L_{55G}$ is less than the radial height $H_{5R}$ of the rotor friction surface 506, as per the below description with respect to FIGS. 6A through 8. The rotation arrow $RA_5$ shows the rotor rotation when the vehicle is moving forward. The foregoing being exemplary, the number of cross-drill hole sets and/or cross-drill hole set groups may be more or less, and the sweep angle of each cross-drill hole set may be the same or be selectively different.

Figure 5C:
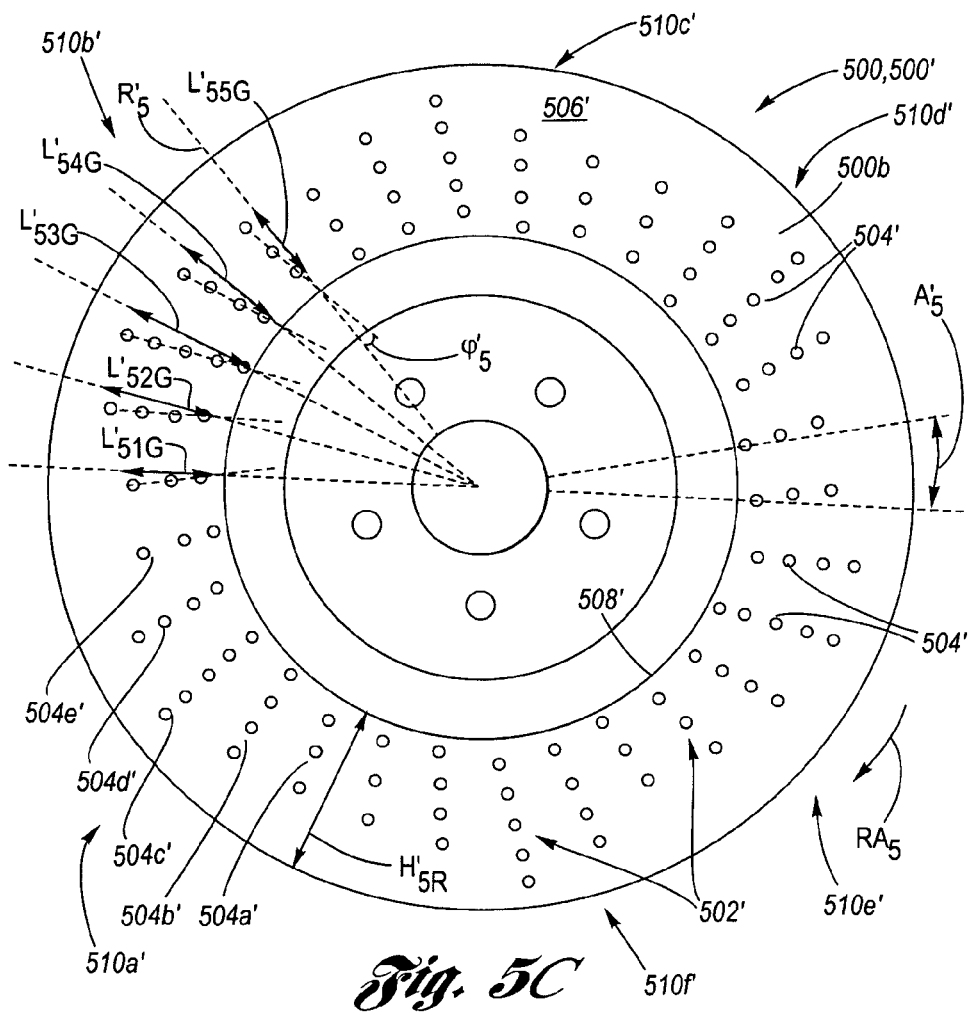
FIG. 5C is a plan view of the outboard side of a modified rotor for use with the rotor of FIGS. 5A and 5B for use in a sliding caliper application, having brake rotor friction surface indent patterns in the form of non-uniform length cross-drill hole sets originating from near the radial inner edge of the rotor.
Figure 5B:
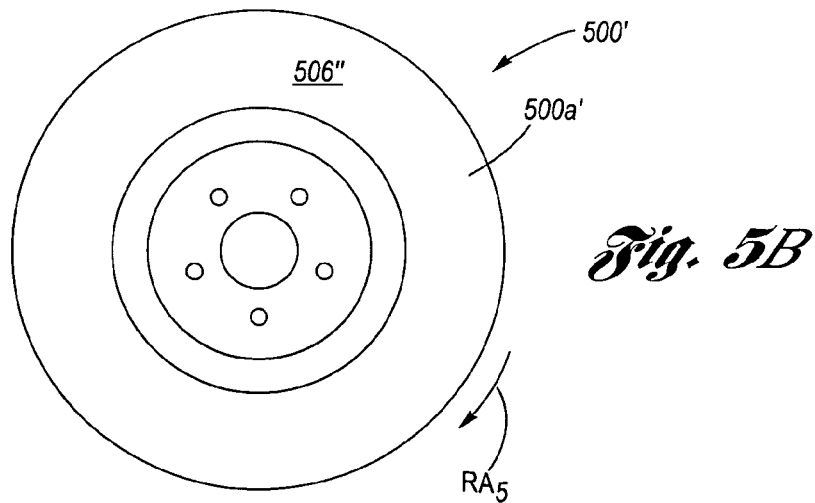
FIG. 5B is a plan view of the inboard side of a modified rotor for use in a sliding caliper application where radial taper wear is not a problem, whereby no brake rotor friction indent patterns are provided.

FIG. 5B shows the inboard side 500a' of a modified brake rotor 500' in which radial taper wear is insubstantial such that no brake rotor friction surface indent patterns are needed at the rotor cheek 506'' at the inboard side 500a' of the rotor 500'. The rotation arrow $RA_5$ shows the rotor rotation when the vehicle is moving forward.

FIG. 5C shows the outboard side 500b of a modified brake rotor 500, 500' for use in a sliding caliper application in conjunction with the inboard side 500a, 500a' of, respectively, either FIGS. 5A or 5B. Although the description below pertains to rotors 500, 500' it is to be understood that FIG. 5C also pertains to the inboard and outboard sides of a brake rotor for use in a fixed caliper application.

The brake rotor friction surface indent patterns 502' are in the form of six periodically repeating cross-drill hole set groups 510a' through 510f', each cross-drill hole set group including cross-drill hole sets 504a' through 504e' (labeled at hole set group 510a'), disposed circumferentially around, and formed in, the friction surface of the rotor cheek 506' of the outboard side 500b of the rotor 500. While the depth and cross-sectional diameter of the holes 504' may be, for example, as described above, or otherwise, each cross-drill hole set 504a' through 504e' of each cross-drill hole set group is of a progressively non-uniform (differing) radial height (or radial length) $L'_{51G}$ through $L'_{55G}$ (labeled at hole group 510b'), and is set at a sweep angle of $\phi'_5$ with respect to the radiant $R'_5$ of the rotor. Each cross-drill hole set 504' originates generally about 6 mm from the radial inner edge 508' of the rotor cheek, preferably outside of the swept friction surface, and each cross-drill hole set is separated in this example from its neighboring cross-drill hole set by an angular separation $A'_5$ of 12 degrees. The radial height $L'_{51G}$ through $L'_{55G}$ is less than the radial height $H'_{5R}$ of the rotor friction surface 506', as per the below description with respect to FIGS. 6A through 8. The rotation arrow $RA_5$ shows the rotor rotation when the vehicle is moving forward. The foregoing being exemplary, the number of cross-drill hole sets and/or cross-drill hole set groups may be more or less, and the sweep angle of each cross-drill hole set may be the same or be selectively different.

By way merely to exposit a comparative, non-limiting example, the sweep angle $\phi_5$, $\phi'_5$ is 20 degrees, and the progressive radial heights may be as follows: cross-drill hole set $L_{51G}$, $L'_{51G}$ is a "short" radial height of 21.7 mm, adjacent cross-drill hole set $L_{52G}$, $L'_{52G}$ is a "medium" radial height of 31.7 mm, adjacent cross-drill hole set $L_{53G}$, $L'_{53G}$ is a "long" radial height of 41.7 mm, adjacent cross-drill hole set $L_{54G}$, $L'_{54G}$ is the "medium" radial height of 31.7 mm, and adjacent cross-drill hole set $L_{55G}$, $L'_{55G}$ is the "short" radial height of 21.7 mm.

Following is a discussion of how the brake rotor friction surface indent patterns affect radial taper wear.

The mechanism of radial taper well is well known in the art. The design of most sliding caliper brake systems involves significant radial taper wear on the outboard brake pad, and a lesser degree of taper wear on the inboard brake pad; whereas, the design of most fixed caliper brake systems involves radial taper wear generally equivalent on the inboard and outboard sides of the brake rotor, wherein the radial taper wear in fixed caliper applications is generally less than that of the outboard side in sliding caliper applications. Therefore, with regard in particular to the outboard side radial taper wear in sliding caliper applications, the outboard bias in brake pad taper wear is driven in large part by caliper stiffness decreasing significantly in the portion of the caliper opposite the caliper actuator cylinder versus the piston cylinder to connector interface. Comparatively high positive radial taper wear on the outboard side of the brake pads tends to rotate the caliper actuator around the vehicle fore-aft axis in an attempt to conform to the brake pads. This movement will bias the piston to inboard pad contact towards the radial inward direction which promotes negative taper wear on the inboard brake pads.

Referring to FIGS. 6A through 8, optimization of the brake rotor friction surface indent patterns will be discussed with particular reference by way of example to the grooving and it will be understood that discussion similarly applies to cross-drilling.

Figure 6A:
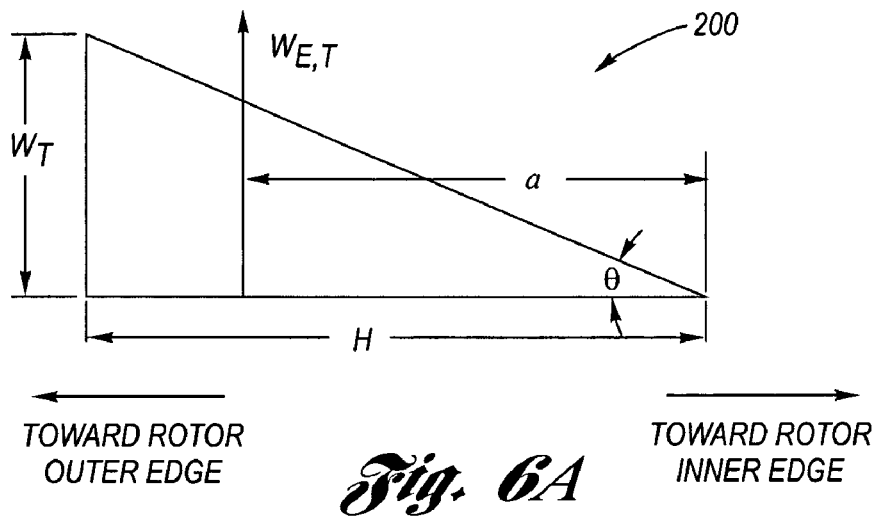
FIG. 6A is a schematic drawing of the bias wear profile of a brake pad with a prior art rotor.

Referring firstly to FIG. 6A, illustrated is a radial taper wear profile 200 of a brake pad in a disc brake system with a prior art rotor configured for a sliding caliper. The profile 200 reflects the assumption that radial taper wear occurs linearly over the area of the brake pad friction surface. The radial height of the brake pad H is used as a dimensional reference for the analysis of the radial taper wear. At the edge of the pad, the maximal wear $W_T$ of the friction surface represents the maximal taper wear as would occur in a prior art rotor. The quantity $W_{E,T}$ represents the equivalent wear of the radial taper wear profile along the friction surface of the brake pad (analogous to the equivalent force representing a force distribution). The angle $\theta$ represents the wear angle associated with radial taper wear. A dimension "a" is a calculated value whereby the average edge position is determined.

From the assumption of linearity of taper wear over the area of the frictional surface and the data presented, one may calculate the groove radial height $L_G$ and the groove sweep angle $\phi$ necessary to produce the maximal reduction in radial taper wear, wherein the parameters of the profile 200 are used to compute the parameters in the grooving (or cross-drilling) pattern according to the present invention.

Figure 6B:
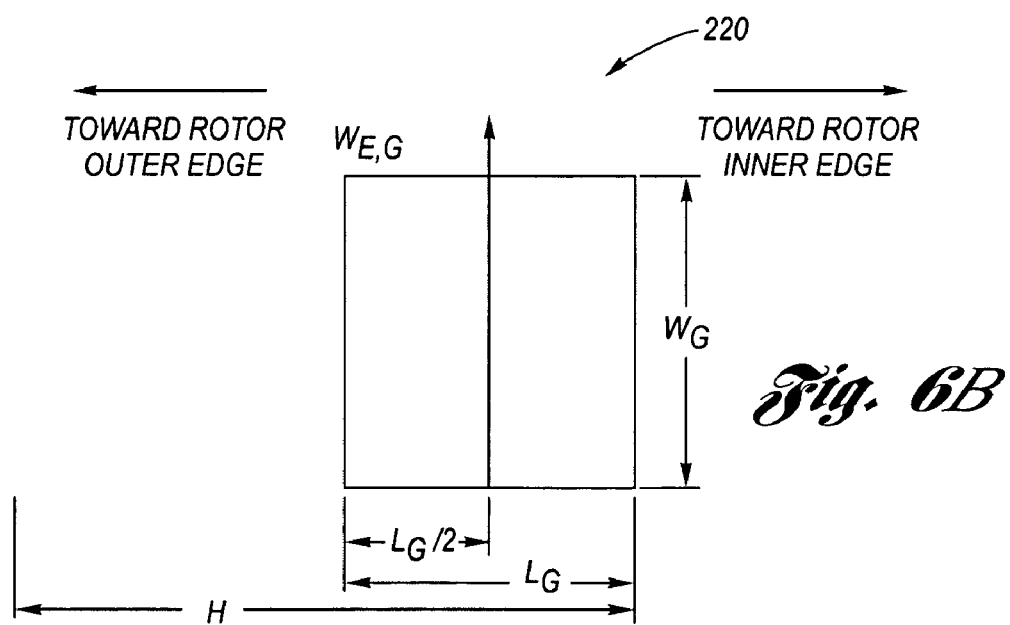
FIG. 6B is a schematic drawing of the bias wear profile of a brake pad with a modified rotor surface according to the present invention.

Referring next to FIG. 6B, the wear profile 220 for a brake pad is shown, reflecting the wear pattern of the brake pad over grooves according to the present invention. The wear profile 220 reflects the assumption that the radial taper wear of the brake pad will generally conform to a step profile. The maximal wear of the friction surface due to the grooves is $W_G$. The wear of the friction surface at the edge thereof due to the grooves is $W_{E,G}$. The required radial height of the groove is $L_G$ (and its half length is $L_{G/2}$).

The results from the assumptions are that the radial taper wear profile 200 from the prior art and the radial taper wear profile 220 according to the present invention allow for computations particularly associated with the grooving (and cross drilling) according to the present invention.

The parameter "a", as defined above, is computed from calculating the moment of wear of the radial taper wear around the brake pad radial inner edge according to the equation:

$$W_{E,T} \cdot a = \int_0^R x \cdot \tan(\theta) \cdot x \, dx, \quad (1)$$

where $W_{E,T}$ is the equivalent wear of the radial taper wear profile (analogous to an equivalent force of a force distribution), R is the radius of the brake rotor and $\theta$ is the wear angle, which allows us to calculate the parameter "a" as:

$$a = \frac{2H}{3}, \quad (2)$$

where H is the radial height of the taper wear pattern, i.e., the radial height of the brake pad. The radial height of the groove is computed by solving for the dimension $L_G$ that yields the closest equivalent moment of wear with the rectangular groove pattern wear bias pattern. The resultant equation is:

$$W_{E,T} \cdot a = \frac{H^2 \cdot W_T}{3} = W_G \cdot L_G \cdot \left(H - \frac{L_G}{2}\right) \cdot L_G, \quad (3)$$

where $W_T$ and $W_G$ are defined above. Solving this equation for $L_G$ yields the following quadratic solution:

$$L_G = W_G \cdot H + \sqrt{W_G^2 \cdot H - \frac{2 \cdot H^2 \cdot W_T}{3}} \quad (4)$$

which has a real solution only when:

$$W_G \geq \sqrt{\frac{2 \cdot W_T}{3}}. \quad (5)$$

Figure 7A:
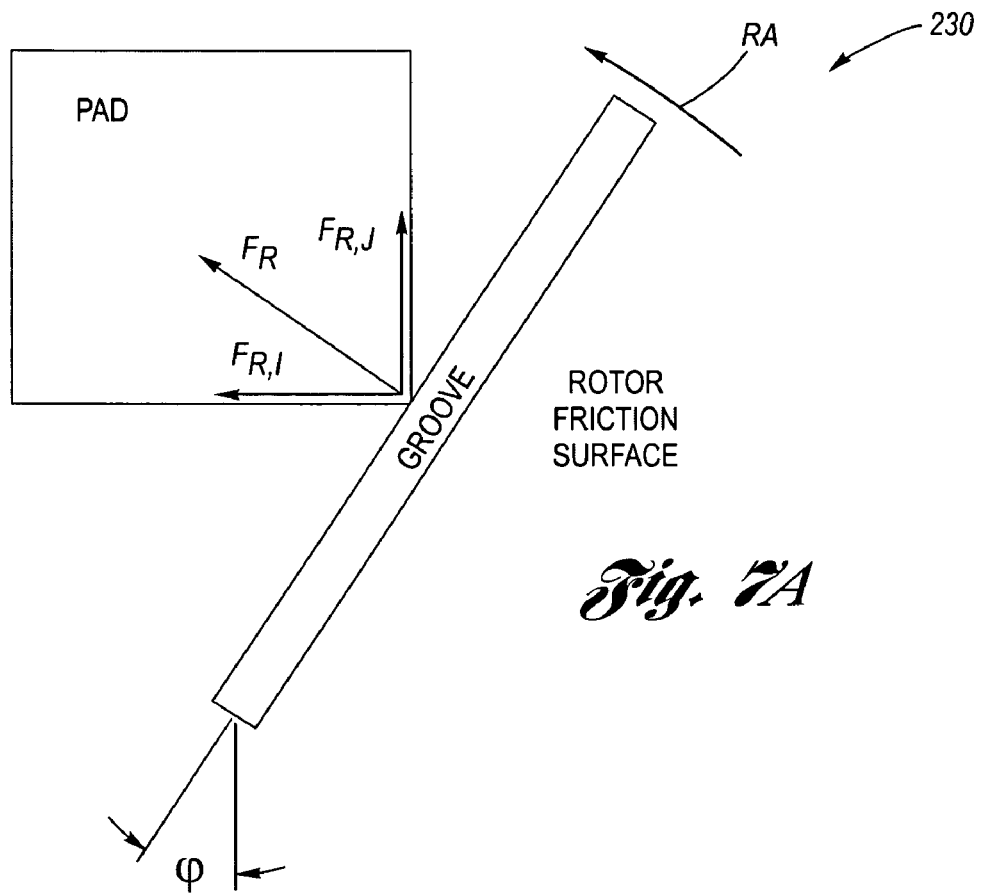
FIG. 7A is a schematic drawing of a brake pad average edge position in accordance with the present invention.
Figure 7B:
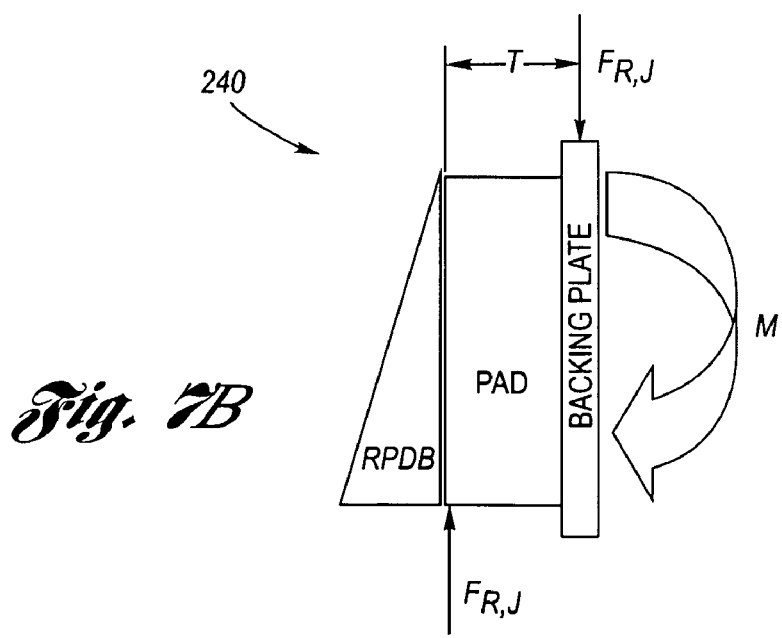
FIG. 7B is a schematic drawing illustrating a brake pad radial pressure distribution bias.

Turning now to FIGS. 7A and 7B, the effects of forces and moments from employing a rotor groove sweep angle $\phi$ are illustrated. FIG. 7A is a diagram 230 which illustrates the vector decomposition of the reaction force $F_R$ caused by using a sweep angle $\phi$ in the grooves of the brake rotor friction surface. $F_R$ is the frictional force on the brake pad that is generated by the groove pattern. $F_{R,J}$ is the projection of the force $F_R$ along the direction of the normal to the radial edge of the rotor. $F_{R,J}$ is the projection of the force $F_R$ perpendicular to $F_{R,J}$. FIG. 7B is a diagram 240 which shows the influence these forces have on the radial pressure distribution bias RPDB on the brake pad. The thickness of the pad between the friction face and the center of the backing plate is defined by T.

The sweep angle $\phi$ of the grooves (or cross-drill hole sets) of the brake rotor friction surface gives rise to a force between the grooves (or cross-drill hole sets) and the brake pad which will tend to push the brake pad friction surface in a radially upward direction. This, combined with the above mentioned reaction force $F_R$ causes a moment M on the pad that will tend to draw the radial inner edge of the pad in towards the rotor, thus further counteracting the forces causing radial taper wear.

The equivalent moment of wear M imposed by employing brake rotor friction surface indent patterns according to the present invention and a sweep angle $\phi$ is given by:

$$M = \frac{H^2 \cdot W_{GI}}{3} = H^2 \cdot F_R \cdot \sin(\varphi) \cdot T \quad (6)$$

where $F_R$ is the friction force on a pad multiplied by an estimate of the percentage of the total friction force on the brake pad that is generated over the groove pattern or the cross-drill hole set pattern on the friction surface of the brake rotor, and where H, $W_{GI}$, and T are as defined above. Note that the effect of the groove sweep angle on the radial force distribution is related to the brake friction force level. Accordingly, the groove (or cross-drill hole set) pattern radial length and the groove (or cross-drill hole set) pattern sweep angle can therefore be optimized for a given set of operating conditions.

The above equations were programmed into a spreadsheet, and the solver feature was used to find the value of $L_G$ for a proposed groove sweep angle that resulted in an exact or closest match possible between the moment of wear driven by the caliper, and the net (sum) moment of wear driven by the groove pattern and groove sweep angle, summarized in Table 1. Table 1 and FIG. 8 show the results for a proposed twin piston sliding caliper application.

TABLE I

| | Value |
|---|---|
| Inputs | |
| Piston Diameter | 42 mm |
| No. of Pistons | 2 |
| Apparent Friction | 0.40 |
| Percent Force on Grooves | 10% |
| Hydraulic Pressure | 5,000 kPa |
| Pad Radial Height | 59 mm |
| Pad Thickness | 8 mm |
| Groove Sweep Angle | 45 deg |
| Wear Increase with Grooves | 1 mm |
| Radial Taper Wear without Grooves | 20 microns/mm |
| Calculated Parameters | |
| Critical Groove Wear | 0.89 mm |
| Friction Force (1 pad) | 5,542 N |
| Upward Force from Grooves | 392 N |
| Moment on Pads from Grooves | 3 Nm |
| Radial Force Gradient due to Groove Sweep Angle | 0.00090 |
| Equiv. Angle of Rad. Force Gradient | 0.052 deg |
| Edge Wear Dimension due to Groove Sweep Angle | 0.053 mm |
| Moment of Wear due to Groove Sweep Angle | 62 mm³ |
| Taper Wear | 1.18 mm |
| Equiv. Caliper Radial Moment of Wear | 1,369 mm³ |
| Equiv. Groove Moment of Wear | 1,307 mm³ |
| Groove + Groove Sweep Angle Equiv. Moment of Wear | 1,369 mm³ |
| Ideal Groove Length, $L_G$ | 29.6 mm |

Figure 8:
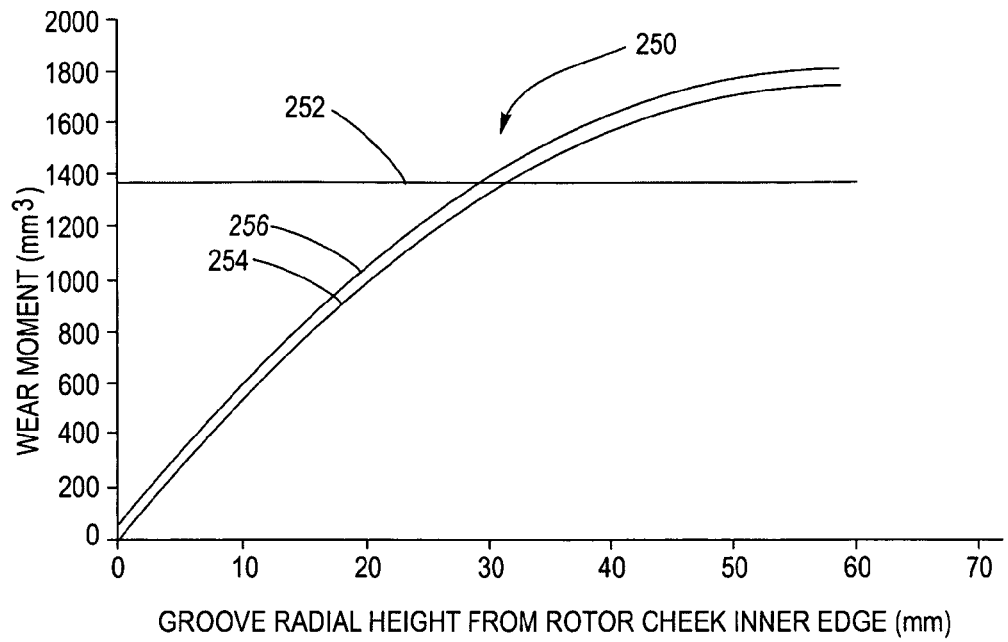
FIG. 8 is a graph of wear moment versus groove length for the caliper moment of wear and for the groove plus groove sweep angle moment of wear for grooves having a sweep angle of 0 degrees and 45 degrees.

Referring now to FIG. 8, depicted is a graph 250 of wear moment versus groove length measured from the radial inner edge of the rotor cheek, wherein plot 252 represents the caliper moment of wear, Plot 254 represents groove plus groove sweep angle of zero degrees, and plot 256 represents groove plus groove sweep angle moment of wear with a sweep angle of 45 degrees. It is seen that with a groove sweep angle of 45 degrees and a braking force distribution of 10% supported by the grooves, the estimated groove pattern radial height to achieve an even radial wear of the brake pad drops from 31.7 mm (plot 254) to 29.6 mm (plot 256). In this regard, the term "braking force distribution of 10% supported by the grooves" means that of the friction generated in the interface, 10 percent of it stems from interaction between the pad and the edges of the grooves, and 90 percent of it from the 'normal' pad to rotor friction interaction elsewhere in the interface. This distribution is appropriate for high energy/high temperature driving conditions where the pad can actually extrude slightly into interference with the grooves.

Figure 9:
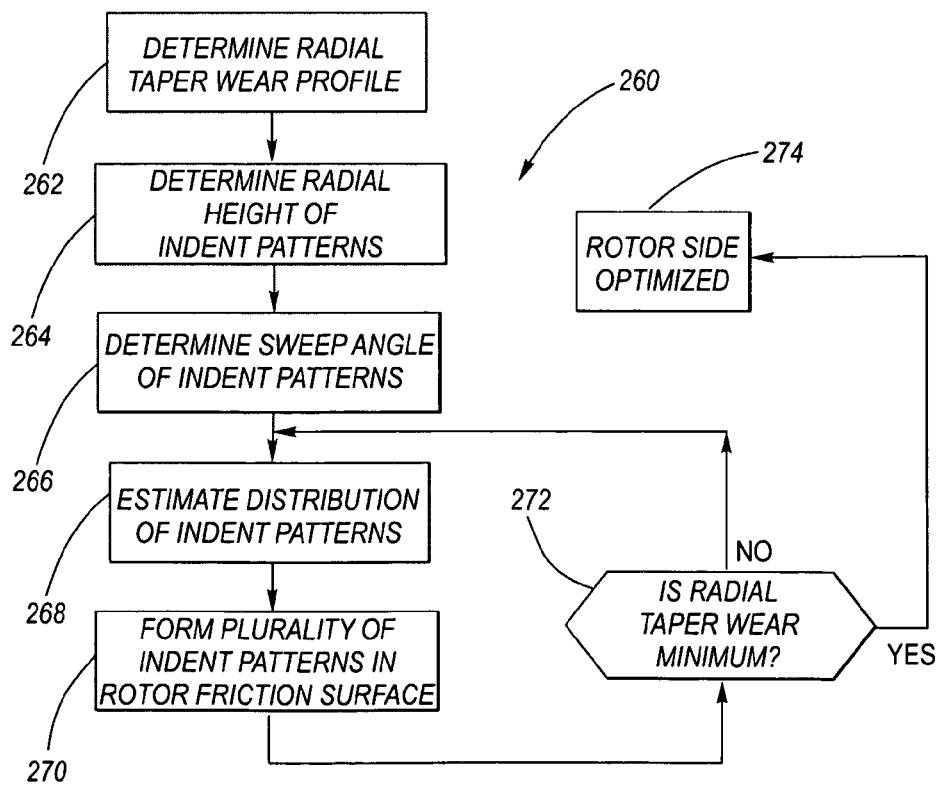
FIG. 9 is an algorithm for carrying out a method for optimizing a brake rotor surface with indent patterns in accordance with the present invention.

Referring now to FIG. 9, an algorithm 260 for carrying out a method for optimizing the brake rotor surface indent patterns will be discussed.

At Block 262, a rectangular radial taper wear profile of a brake pad is determined, as for example in the manner exemplified by 200 in FIG. 6A and the accompanying discussion recounted above. Next, at Block 264 an optimal radial height of the indent patterns is determined, as for example via the above discussion with respect to FIGS. 6A and 6B and equations (1) through (5), as based upon a closest equivalent moment of wear with respect to the rectangular radial taper wear profile of Block 262. Next, at Block 266 an optimal sweep angle of the indent patterns is determined, as for example via the above discussion with respect to FIGS. 7A and 7B and equation (6), wherein the sweep angle is an angle measured with respect to a radiant of the rotor (generally being between 0 degrees and about 70 degrees), wherein where the sweep angle is greater than zero degrees, the radially innermost portion of the indent patterns is leading with respect to the rotation direction of the rotor when the motor vehicle is moving in a forward direction. Then at Block 268, a distribution of the indent patterns is selected based upon empirical estimation. At Block 270, a brake rotor is fabricated which is predetermined to suit a particular brake corner application, and the determined plurality of indent patterns from Blocks 262 to 268 is formed in the selected rotor cheek thereof. At Decision Block 272, the rotor cheek is tested to determine whether the indent patterns provide an optimal minimization of radial taper wear, per the brake corner application. If the answer to the inquiry is no, then Blocks 268 to 272 are repeated until optimization is achieved, whereupon the answer to the inquiry at Decision Block 272 will be yes, and the rotor side is then optimized at Block 274. The other side of the brake rotor is then optimized with indent patterns (if necessary) by a repeat of algorithm 260, whereupon the brake rotor is optimized for minimization of radial taper wear.

An evaluation of various brake rotors was performed, including a conventional brake rotor and brake rotors having indent patterns according to the present invention, per the following example.

EXAMPLE

Three brake rotors were tested in a dynamometer simulating a brake corner to evaluate radial taper wear characteristics. A first rotor had no brake rotor friction surface indent patterns, and served as a baseline. A second rotor had a brake rotor friction surface indent pattern on the outboard side in the form of 6 groups of 5 grooves per group, the radial heights being characterized as being "short", "medium", "long", "medium", and "short", wherein the "short" was 21.7 mm, the "medium" was 31.7 mm, and the "long" was 41.7 mm, as shown by way of example at FIG. 4C. And a third rotor having a brake rotor friction surface indent pattern in the form of equal length grooves, equally spaced and numbering 30, the length being 31.7 mm, generally as shown by way of example at FIG. 2D.

The test equipment was as follows. The caliper was manufactured by ADVICS Mfg. Ohio, Inc. of Lebanon, Ohio of cast iron sliding caliper with dual pistons (disposed at one side thereof) with a total area of 2,877.4 mm$^2$. The rotors were vented cast iron having a mass of 11.28 kg, an outer diameter of 345 mm, a cheek inner diameter of 203 mm, a rotor width of 30 mm, and a brake rotor plate width of 9.75 mm (outer) and 9.0 mm (inner). The brake pad lining was manufactured by Federal Mogul, product lining edge code HP1000/2. The inboard and outboard brake pads each had (puck only) length of 145.5 mm, width of 57 mm, a height of 9.3 mm, and a mass of 0.598 kg. The backing plate was steel with a thickness of 6.5 mm. The aspect ratio (L/W) was 2.55. The surface area was 8,293.5 cm$^2$, and the volume was 7,671,487.5 mm$^3$.

The following results were obtained.

Both the second and third (grooved) rotors showed lower warm burnished apparent friction than the first (baseline) rotor. This is consistent with performance observed on cross-drilled rotors, as reported in "The effect of Rotor Crossdrilling on Brake Performance" by D. Antanaitis and A. Rifici, SAE Technical paper 2006-01-0691 (2006). It does not result in an appreciable change in pedal feel in this condition. The second (unequal length grooved) rotor showed the lowest apparent friction in this case, consistent with it having the highest coverage of the friction surface.

Both of the second and third (grooved) rotors showed higher apparent friction during the fade sequences than the first (baseline) rotor, 0.24 for the second and third rotors, versus 0.22 for the first rotor, a 9 percent improvement for the second and third rotors versus the first rotor. This is a result of the lower radial taper wear and increased mechanical efficiency of the caliper, and the added pad to rotor interaction mechanism on the outboard fade afforded by the grooving patterns.

Both of the second and third (grooved) rotors exhibited lower radial taper wear than the first (baseline) rotor, 13.0 microns/mm for the second (differing groove length) rotor and 15.4 microns/mm for the third (equal groove length) rotor versus 22.6 microns/mm for the first (baseline) rotor. This is due to the groove pattern causing a 'moment of wear' opposite that of the moment of wear caused by caliper deflection and increasing friction surface sliding speed.

Both of the second and third (grooved) rotors achieved lower apparent piston travel during the fade sequences than the first (baseline) rotor. This is a result of lower outboard pad radial taper wear.

The conclusion is that both the second (unequal length grooved) rotor and the third (equal length grooved) rotor provide lower output in the new burnished condition, higher output in the fade condition, and lower apparent piston travel. The second (unequal length grooved) rotor was the most effective, and had the added benefit of reducing brake torque variation on the order of 50 percent during the fade sections. Both the second and third rotors reduced radial taper wear, with little effect on brake pad lining wear rates.

Accordingly, it is most preferred to utilize brake rotor friction indent patterns which are arranged in repeating groups, wherein each brake rotor friction indent pattern of each group is of progressively non-uniform (differing) radial height, as for example as shown at FIGS. 4A, 4C, 5A and 5C.

To those skilled in the art to which this invention appertains, the above described preferred embodiments may be subject to change or modification. Such change or modification can be carried out without departing from the scope of the invention, which is intended to be limited only by the scope of the appended claims.

The invention claimed is:

1. A brake rotor for a disc brake system of a motor vehicle, the disc brake system including a caliper, an inboard brake pad and an outboard brake pad, said brake rotor comprising:
    an inboard side rotor cheek having an inboard radial inner edge and an oppositely disposed inboard radial outer edge, said inboard inner and outer radial edges being mutually separated by an inboard rotor radial height, an inboard friction surface being located at said inboard side rotor cheek; and
    an outboard side rotor cheek having an outboard radial inner edge and an oppositely disposed outboard radial outer edge, said outboard inner and outer radial edges being mutually separated by an outboard rotor radial height, an outboard friction surface being located at said outboard side rotor cheek;
    wherein said outboard friction surface has formed therein a plurality of outboard brake rotor friction surface indent patterns disposed circumferentially around said outboard friction surface, all of said outboard brake rotor friction surface indent patterns being disposed closer to said outboard radial inner edge than to said outboard radial outer edge such that said outboard brake rotor friction surfaces originate substantially at said outboard radial inner edge generally outside said outboard friction surface and terminate remotely from said outboard radial outer edge generally inside said outboard friction surface, each said outboard brake rotor surface indent pattern being oriented at a predetermined outboard sweep angle with respect to a radiant of the rotor and extending a predetermined outboard radial height parallel to the radiant less than said outboard rotor radial height such that said plurality of outboard brake rotor friction surface indent patterns reduce radial taper wear of the outboard side brake pad of the disc brake system.

2. The brake rotor of claim 1, wherein said plurality of outboard brake rotor friction surface indent patterns comprises a plurality of grooves.

3. The brake rotor of claim 2, wherein said plurality of grooves is arranged as a plurality of groove groups periodically repeating circumferentially around said outboard friction surface, wherein each said groove group comprises a plurality of grooves, each groove thereof being of a progressively selected non-uniform radial height comprising a shortest radial height to progressively a longest radial height, then progressively to the shortest radial height.

4. The brake rotor of claim 1, wherein said plurality of brake rotor friction surface indent patterns comprises a plurality of cross-drill hole sets, each said cross-drill hole set comprising a plurality of cross-drill holes.

5. The brake rotor of claim 4, wherein said plurality of cross-drill hole sets are arranged as a plurality of hole set groups periodically repeating circumferentially around said outboard friction surface, wherein each said hole set group comprises a plurality of cross-drill hole sets, each cross-drill hole set thereof being of a progressively selected non-uniform radial height comprising a shortest radial height to progressively a longest radial height, then progressively to the shortest radial height.

6. The brake rotor of claim 1, further comprising:
    said inboard friction surface having formed therein a plurality of inboard brake rotor friction surface indent patterns disposed circumferentially around said inboard friction surface, all of said inboard brake rotor friction surface indent patterns originating substantially at said inboard radial inner edge and terminating remotely from said inboard radial outer edge, wherein all of said inboard brake rotor friction surface indent patterns are disposed closer to said inboard radial inner edge than to said inboard radial outer edge, each said inboard brake rotor surface indent pattern being oriented at a predetermined inboard sweep angle with respect to an inboard radiant of the rotor and extending a predetermined inboard radial height parallel to the inboard radiant less than said inboard rotor radial height such that said plurality of brake rotor friction surface indent patterns reduce radial taper wear of the inboard side brake pad of the disc brake system.

7. The brake rotor of claim 6, wherein said plurality of outboard brake rotor friction surface indent patterns comprise a plurality of outboard grooves; and wherein said plurality of inboard brake rotor friction surface indent patterns comprise a plurality of inboard grooves.

8. The brake rotor of claim 7, wherein:
said plurality of outboard grooves is arranged as a plurality of outboard groove groups periodically repeating circumferentially around said outboard friction surface, wherein each said outboard groove group comprises a plurality of outboard grooves, each outboard groove thereof being of a progressively selected non-uniform radial height comprising a shortest radial height progressively to a longest radial height, then progressively to the shortest radial height; and
said plurality of inboard grooves is arranged as a plurality of inboard groove groups periodically repeating circumferentially around said inboard friction surface, wherein each said inboard groove group comprises a plurality of inboard grooves, each inboard groove thereof being of a progressively selected non-uniform radial height comprising a shortest radial height to progressively a longest radial height, then progressively to the shortest radial height.

9. The brake rotor of claim 6, wherein said plurality of outboard brake rotor friction surface indent patterns comprise a plurality of outboard cross-drill hole sets; and wherein said plurality of inboard brake rotor friction surface indent patterns comprise a plurality of inboard cross-drill hole sets.

10. The brake rotor of claim 9, wherein:
said plurality of outboard cross-drill hole sets is arranged as a plurality of outboard cross-drill hole set groups periodically repeating circumferentially around said outboard friction surface, wherein each said outboard cross-drill hole set group comprises a plurality of outboard cross-drill hole sets, each outboard cross-drill hole set thereof being of a progressively selected non-uniform radial height comprising a shortest radial height to progressively a longest radial height, then progressively to the shortest radial height; and
said plurality of inboard cross-drill hole sets is arranged as a plurality of inboard cross-drill hole set groups periodically repeating circumferentially around said inboard friction surface, wherein each said inboard cross-drill hole set group comprises a plurality of inboard cross-drill hole sets, each inboard cross-drill hole set thereof being of a progressively selected non-uniform radial height comprising a shortest radial height to progressively a longest radial height, then progressively to the shortest radial height.

11. The brake rotor of claim 1, further comprising:
said inboard friction surface having formed therein a plurality of inboard brake rotor friction surface indent patterns disposed circumferentially around said inboard friction surface, all of said inboard brake rotor friction surface indent patterns originating substantially at said inboard radial outer edge and terminating remotely from said inboard radial inner edge, wherein all of said inboard brake rotor friction surface indent patterns are disposed closer to said inboard radial outer edge than to said inboard radial inner edge, each said inboard brake rotor surface indent pattern being oriented at a predetermined inboard sweep angle with respect to an inboard radiant of the rotor and extending a predetermined inboard radial height parallel to the inboard radiant less than said inboard rotor radial height such that said plurality of brake rotor friction surface indent patterns reduce radial taper wear of the inboard side brake pad of the disc brake system.

12. The brake rotor of claim 11, wherein said plurality of outboard brake rotor friction surface indent patterns comprise a plurality of outboard grooves; and wherein said plurality of inboard brake rotor friction surface indent patterns comprise a plurality of inboard grooves.

13. The brake rotor of claim 12, wherein:
said plurality of outboard grooves is arranged as a plurality of outboard groove groups periodically repeating circumferentially around said outboard friction surface, wherein each said outboard groove group comprises a plurality of outboard grooves, each outboard groove thereof being of a progressively selected non-uniform radial height comprising a shortest radial height to progressively a longest radial height, then progressively to the shortest radial height; and
said plurality of inboard grooves is arranged as a plurality of inboard groove groups periodically repeating circumferentially around said inboard friction surface, wherein each said inboard groove group comprises a plurality of inboard grooves, each inboard groove thereof being of a progressively selected non-uniform radial height comprising a shortest radial height to progressively a longest radial height, then progressively to the shortest radial height.

14. The brake rotor of claim 11, wherein said plurality of outboard brake rotor friction surface indent patterns comprise a plurality of outboard cross-drill hole sets; and wherein said plurality of inboard brake rotor friction surface indent patterns comprise a plurality of inboard cross-drill hole sets.

15. The brake rotor of claim 14, wherein:
said plurality of outboard cross-drill hole sets is arranged as a plurality of outboard cross-drill hole set groups periodically repeating circumferentially around said outboard friction surface, wherein each said outboard cross-drill hole set group comprises a plurality of outboard cross-drill hole sets, each outboard cross-drill hole set thereof being of a progressively selected non-uniform radial height comprising a shortest radial height to progressively a longest radial height, then progressively to the shortest radial height; and
said plurality of inboard cross-drill hole sets is arranged as a plurality of inboard cross-drill hole set groups periodically repeating circumferentially around said inboard friction surface, wherein each said inboard cross-drill hole set group comprises a plurality of inboard cross-drill hole sets, each inboard cross-drill hole set thereof being of a progressively selected non-uniform radial height comprising a shortest radial height to progressively a longest radial height, then progressively to the shortest radial height.

16. A disc brake system of a motor vehicle, comprising:
a sliding caliper;
an inboard brake pad connected with said sliding caliper;
an outboard brake pad connected with said sliding caliper; and
a brake rotor comprising:
an outboard side rotor cheek disposed facing said outboard brake pad, said outboard side rotor cheek having an outboard radial inner edge and an oppositely disposed outboard radial outer edge, said outboard inner and outer radial edges being mutually separated by an outboard rotor radial height, an outboard friction surface being located at said outboard side rotor cheek;
a plurality of outboard brake rotor friction surface indent patterns disposed circumferentially around said outboard friction surface, all of said outboard brake rotor friction surface indent patterns being disposed closer to said outboard radial inner edge than to said outboard radial outer edge such that said outboard brake rotor friction surfaces originate substantially at said outboard radial inner edge generally outside said outboard friction surface and terminate remotely from said outboard radial outer edge generally inside said outboard friction surface, each said outboard brake rotor surface indent pattern being oriented at a predetermined outboard sweep angle with respect to a radiant of the rotor and extending a predetermined indent radial height parallel to the radiant less than said outboard rotor radial height; and
an inboard side rotor cheek disposed facing said inboard brake pad, said inboard side rotor cheek having an inboard radial inner edge and an oppositely disposed inboard radial outer edge, said inboard inner and outer radial edges being mutually separated by an inboard rotor radial height, an inboard friction surface being located at said inboard side rotor cheek;
wherein said predetermined indent radial height is such that said plurality of outboard brake rotor friction surface indent patterns reduce radial taper wear of the outboard brake pad of the disc brake system.

17. The disc brake system of claim 16, wherein:
said plurality of outboard brake rotor surface indent patterns is arranged as a plurality of outboard brake rotor surface indent pattern groups periodically repeating circumferentially around said outboard friction surface, wherein each said outboard brake rotor surface indent pattern group comprises a plurality of outboard brake rotor surface indent patterns, each outboard brake rotor surface indent pattern thereof being of a progressively selected non-uniform radial height comprising a shortest radial height to progressively a longest radial height, then progressively to the shortest radial height; and
said outboard sweep angle is between 0 degrees and substantially 70 degrees, wherein if the outboard sweep angle is greater than 0 degrees, then the radially innermost portion of said outboard brake rotor friction surface indent patterns is leading with respect to a rotation direction of the brake rotor when the motor vehicle is moving in a forward direction.

18. The disc brake system of claim 16, further comprising:
a plurality of inboard brake rotor friction surface indent patterns disposed circumferentially around said inboard friction surface, all of said inboard brake rotor friction surface indent patterns originating substantially at said inboard radial outer edge and terminating remotely from said inboard radial inner edge, wherein all of said inboard brake rotor friction surface indent patterns are disposed closer to said inboard radial outer edge than to said inboard radial inner edge, each said inboard brake rotor surface indent pattern being oriented at a predetermined inboard sweep angle with respect to a radiant of the rotor and extending a predetermined indent radial height parallel to the radiant less than said inboard rotor radial height;
wherein said predetermined indent radial height is such that said plurality of inboard brake rotor friction surface indent patterns reduce radial taper wear of the inboard brake pad of the disc brake system.

19. The disc brake system of claim 18, wherein:
said plurality of outboard brake rotor surface indent patterns is arranged as a plurality of outboard brake rotor surface indent pattern groups periodically repeating circumferentially around said outboard friction surface, wherein each said outboard brake rotor surface indent pattern group comprises a plurality of outboard brake rotor surface indent patterns, each outboard brake rotor surface indent pattern thereof being of a progressively selected non-uniform radial height comprising a shortest radial height to progressively a longest radial height, then progressively to the shortest radial height;
said outboard sweep angle is between 0 degrees and substantially 70 degrees, wherein if the outboard sweep angle is greater than 0 degrees, then the radially innermost portion of said outboard brake rotor friction surface indent patterns is leading with respect to a rotation direction of the brake rotor when the motor vehicle is moving in a forward direction;
said plurality of inboard brake rotor surface indent patterns is arranged as a plurality of inboard brake rotor surface indent pattern groups periodically repeating circumferentially around said inboard friction surface, wherein each said inboard brake rotor surface indent pattern group comprises a plurality of inboard brake rotor surface indent patterns, each inboard brake rotor surface indent pattern thereof being of a progressively selected non-uniform radial height comprising a shortest radial height to progressively a longest radial height, then progressively to the shortest radial height; and
said inboard sweep angle is between 0 degrees and substantially 70 degrees, wherein if the inboard sweep angle is greater than 0 degrees, then the radially innermost portion of said inboard brake rotor friction surface indent patterns is leading with respect to the rotation direction of the brake rotor when the motor vehicle is moving in the forward direction.

20. A disc brake system of a motor vehicle, comprising:
a fixed caliper;
an inboard brake pad connected with said fixed caliper;
an outboard brake pad connected with said fixed caliper; and
a brake rotor comprising:
an inboard side rotor cheek disposed facing said inboard brake pad, said inboard side rotor cheek having an inboard radial inner edge and an oppositely disposed inboard radial outer edge, said inboard inner and outer radial edges being mutually separated by an inboard rotor radial height, an inboard friction surface being located at said inboard side rotor cheek;
a plurality of inboard brake rotor friction surface indent patterns disposed circumferentially around said inboard friction surface, all of said inboard brake rotor friction surface indent patterns originating substantially at said inboard radial inner edge and terminating remotely from said inboard radial outer edge, wherein all of said inboard brake rotor friction surface indent patterns are disposed closer to said inboard radial inner edge than to said inboard radial outer edge, each said inboard brake rotor surface indent pattern being oriented at a predetermined inboard sweep angle with respect to an inboard radiant of the rotor and extending a predetermined inboard indent radial height parallel to the inboard radiant less than said inboard rotor radial height;

an outboard side rotor cheek disposed facing said outboard brake pad, said outboard side rotor cheek having an outboard radial inner edge and an oppositely disposed outboard radial outer edge, said outboard inner and outer radial edges being mutually separated by an outboard rotor radial height an outboard friction surface being located at said outboard side rotor cheek; and a plurality of outboard brake rotor friction surface indent patterns disposed circumferentially around said outboard friction surface, all of said outboard brake rotor friction surface indent patterns being disposed closer to said outboard radial inner edge than to said outboard radial outer edge such that said outboard brake rotor friction surfaces originate substantially at said outboard radial inner edge generally outside said outboard friction surface and terminate remotely from said outboard radial outer edge generally inside said outboard friction surface, each said outboard brake rotor surface indent pattern being oriented at a predetermined outboard sweep angle with respect to an outboard radiant of the rotor and extending a predetermined outboard indent radial height parallel to the outboard radiant distantly less than said outboard rotor radial height;

wherein said predetermined inboard indent radial height is such that said plurality of inboard brake rotor friction surface indent patterns reduce radial taper wear of the inboard brake pad of the disc brake system; and wherein said predetermined outboard indent radial height is such that said plurality of outboard brake rotor friction surface indent patterns reduce radial taper wear of the outboard brake pad of the disc brake system.

21. The disc brake system of claim 20, wherein:

said plurality of outboard brake rotor surface indent patterns is arranged as a plurality of outboard brake rotor surface indent pattern groups periodically repeating circumferentially around said outboard friction surface, wherein each said outboard brake rotor surface indent pattern group comprises a plurality of outboard brake rotor surface indent patterns, each outboard brake rotor surface indent pattern thereof being of a progressively selected non-uniform radial height comprising a shortest radial height to progressively a longest radial height, then progressively to the shortest radial height;

said outboard sweep angle is between 0 degrees and substantially 70 degrees, wherein if the outboard sweep angle is greater than 0 degrees, then the radially innermost portion of said outboard brake rotor friction surface indent patterns is leading with respect to a rotation direction of the brake rotor when the motor vehicle is moving in a forward direction;

said plurality of inboard brake rotor surface indent patterns is arranged as a plurality of inboard brake rotor surface indent pattern groups periodically repeating circumferentially around said inboard friction surface, wherein each said inboard brake rotor surface indent pattern group comprises a plurality of inboard brake rotor surface indent patterns, each inboard brake rotor surface indent pattern thereof being of a progressively selected non-uniform radial height comprising a shortest radial height to progressively a longest radial height, then progressively to the shortest radial height; and said inboard sweep angle is between 0 degrees and substantially 70 degrees, wherein if the outboard sweep angle is greater than 0 degrees, then the radially innermost portion of said inboard brake rotor friction surface indent patterns is leading with respect to the rotation direction of the brake rotor when the motor vehicle is moving in the forward direction.

22. A method for reducing radial taper wear of brake pads of disc brake systems, comprising the steps of:

determining a radial taper wear profile for an outboard brake pad of the disc brake system;

providing a brake rotor having an inboard friction surface of an inboard rotor cheek, and an outboard friction surface of an outboard rotor cheek; and forming a plurality of outboard brake rotor friction surface indent patterns in said outboard friction surface disposed circumferentially around said outboard friction surface and originating substantially at an outboard radial inner edge of the outboard rotor cheek, each said outboard brake rotor surface indent pattern being oriented at a predetermined outboard sweep angle with respect to an outboard radiant of the rotor and extending a predetermined outboard radial height parallel to the outboard radiant less than an outboard rotor radial height such that said plurality of outboard brake rotor friction surface indent patterns reduce the radial taper wear of the outboard brake pad of the disc brake system responsive to the radial taper wear profile.

23. The method of claim 22, wherein said step of determining comprises:

determining a radial height of the taper wear pattern of the outboard brake pad;

determining a radial height of the outboard brake rotor surface indent pattern responsive to the determined height of the taper wear pattern of the outboard brake pad;

determining an outboard sweep angle for the outboard brake rotor friction surface indent patterns responsive to said taper wear pattern of the outboard brake pad; and determining a distribution of the outboard brake rotor friction surface indent patterns;

wherein said steps of determining are such that the closest equivalent moment of wear of the outboard brake pad is provided.

24. The method of claim 23, further comprising:

determining radial taper wear profile for an inboard brake pad of the disc brake system; and forming a plurality of inboard brake rotor friction surface indent patterns in said inboard friction surface disposed circumferentially around said inboard friction surface and originating substantially at an inboard radial inner edge of the inboard rotor cheek, each said inboard brake rotor surface indent pattern being oriented at a predetermined inboard sweep angle with respect to an inboard radiant of the rotor and extending a predetermined inboard radial height parallel to the inboard radiant less than an inboard rotor radial height such that said plurality of inboard brake rotor friction surface indent patterns reduce the radial taper wear of the inboard brake pad of the disc brake system responsive to the radial taper wear profile.

25. The method of claim 24, wherein said step of determining comprises:
   determining a radial height of the taper wear pattern of the inboard brake pad;
   determining a radial height of the inboard brake rotor surface indent pattern responsive to the determined height of the taper wear pattern of the inboard brake pad;
   determining an inboard sweep angle for the inboard brake rotor friction surface indent patterns responsive to said taper wear pattern of the inboard brake pad; and
   determining a distribution of the inboard brake rotor friction surface indent patterns;
   wherein said steps of determining are such that the closest equivalent moment of wear of the inboard brake pad is provided.

26. The method of claim 23, further comprising:
   determining radial taper wear profile for an inboard brake pad of the disc brake system; and
   forming a plurality of inboard brake rotor friction surface indent patterns in said inboard friction surface disposed circumferentially around said inboard friction surface and originating substantially at an inboard radial outer edge of the inboard rotor cheek, each said inboard brake rotor surface indent pattern being oriented at a predetermined inboard sweep angle with respect to an inboard radiant of the rotor and extending a predetermined inboard radial height parallel to the inboard radiant less than an inboard rotor radial height such that said plurality of inboard brake rotor friction surface indent patterns reduce the radial taper wear of the inboard brake pad of the disc brake system responsive to the radial taper wear profile.

27. The method of claim 26, wherein said step of determining comprises:
   determining a radial height of the taper wear pattern of the inboard brake pad;
   determining a radial height of the inboard brake rotor surface indent pattern responsive to the determined height of the taper wear pattern of the inboard brake pad;
   determining an inboard sweep angle for the inboard brake rotor friction surface indent patterns responsive to said taper wear pattern of the inboard brake pad; and
   determining a distribution of the inboard brake rotor friction surface indent patterns;
   wherein said steps of determining are such that the closest equivalent moment of wear of the inboard brake pad is provided.

28. A brake rotor product made according to the method of claim 22.

* * * * *